(12) United States Patent
Yokoyama

(10) Patent No.: US 10,160,506 B2
(45) Date of Patent: Dec. 25, 2018

(54) STRADDLE TYPE VEHICLE

(71) Applicant: HONDA MOTOR CO., LTD., Tokyo (JP)

(72) Inventor: Yuichi Yokoyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 15/235,454

(22) Filed: Aug. 12, 2016

(65) Prior Publication Data
US 2017/0057583 A1  Mar. 2, 2017

(30) Foreign Application Priority Data

Aug. 31, 2015  (JP) .................. 2015-171521

(51) Int. Cl.
*B62M 7/00* (2010.01)
*B62J 17/02* (2006.01)
*B62K 5/027* (2013.01)
*B62K 11/04* (2006.01)
*B60K 11/02* (2006.01)
*B60K 13/02* (2006.01)
*B62K 25/04* (2006.01)

(52) U.S. Cl.
CPC .............. *B62J 17/02* (2013.01); *B60K 11/02* (2013.01); *B60K 13/02* (2013.01); *B62K 5/027* (2013.01); *B62K 11/04* (2013.01); *B62K 25/04* (2013.01)

(58) Field of Classification Search
CPC .......... B62J 17/02; B60K 13/00; B60K 13/02; B62K 5/027; B62K 11/00; B62K 11/04; F02M 35/0204; F02M 35/162; F02M 35/14

USPC ......................................... 180/218, 219, 229
See application file for complete search history.

(56) References Cited

U.S. PATENT DOCUMENTS

| 7,357,203 B2* | 4/2008 | Morrow ................... B60K 6/40 180/65.1 |
| 7,380,624 B2* | 6/2008 | Momosaki ....... F02M 35/10013 180/68.3 |
| 2011/0232983 A1* | 9/2011 | Abe .................... B01D 46/0005 180/68.3 |
| 2015/0034405 A1* | 2/2015 | Abe ....................... B62K 19/48 180/219 |

(Continued)

FOREIGN PATENT DOCUMENTS

| DE | 102014214223 A1 | 1/2015 |
| JP | 2-117486 A | 5/1990 |

(Continued)

*Primary Examiner* — Tony H Winner
(74) *Attorney, Agent, or Firm* — Birch, Stewart, Kolasch & Birch, LLP

(57) ABSTRACT

To suppress intake noise and secure a quiet ride on a straddle type vehicle wherein a box-shaped structure includes an air cleaner box connected to an engine. In addition, exhaust air from the radiator disposed in the vicinity of the box-shaped structure is prevented from hitting a leg portion of a rider. A main frame is provided as a separate body from a head box so as to support a power unit and a front two-wheeled suspension device. The head box is supported on the main frame due to the fact that an air cleaner box is fixed on the main frame through a fixing member. A guide portion is formed on the air cleaner box so as to guide the exhaust wind from a radiator to the lower direction.

12 Claims, 20 Drawing Sheets

(56) References Cited

U.S. PATENT DOCUMENTS

| | | |
|---|---|---|
| 2015/0041232 A1 | 2/2015 | Takatsuka et al. |
| 2015/0275832 A1* | 10/2015 | Kontani .................. B62K 11/04 180/219 |
| 2015/0345440 A1* | 12/2015 | Nishizawa ......... F02M 35/1255 180/219 |
| 2016/0368369 A1* | 12/2016 | Nakayama ............... B62J 17/00 |
| 2017/0284347 A1* | 10/2017 | Ozaki ........................ B62J 1/08 |

FOREIGN PATENT DOCUMENTS

| JP | 2009-292467 A | 12/2009 |
|---|---|---|
| JP | 2012-206694 A | 10/2012 |
| JP | 2015-33975 A | 2/2015 |

\* cited by examiner

STRADDLE TYPE VEHICLE

CROSS-REFERENCE TO RELATED APPLICATIONS

The present application claims priority under 35 USC 119 to Japanese Patent Application No. 2015-171521 filed Aug. 31, 2015 the entire contents of which are hereby incorporated by reference.

BACKGROUND OF THE INVENTION

1. Field of the Invention

The present invention relates to a straddle type vehicle.

2. Description of Background Art

A straddle type vehicle is known that includes a conventional box-shaped structure having a head pipe with an air cleaner box being supported on an engine. See, for example, Japanese Laid-open Patent Publication No. 2009-292467. A load from the front wheel suspension device which is supported on a head pipe is input on the box-shaped structure. Accordingly, the box-shaped structure requires strength and rigidity as a main frame.

When the air cleaner box with strength and rigidity is directly supported on the engine and receives a strong vibration, the intake noise easily tends to be loud, like the conventional techniques as above-mentioned. Moreover, if the box-shaped structure is disposed in the vicinity of a radiator, some consideration is required such that the exhaust air from the radiator hardly hits the leg portion of rider.

SUMMARY AND OBJECTS OF THE INVENTION

It is an object according to an embodiment of the present invention to suppress the intake noise and to secure a quietness in a straddle type vehicle wherein a box-shaped structure including an air cleaner box is connected to the engine. In addition, the present invention also aims to prevent the exhaust air from the radiator, which is disposed in the vicinity of the box-shaped structure, from hitting the leg portion of the rider.

According to an embodiment of the present invention, a straddle type vehicle (1) comprising a head box (50) which includes an inserted head pipe (51) into which a handle steering shaft (12) is inserted and a filtered air cleaner box (52) which sucks and filters the flow of air from the front direction of the vehicle. A main frame (18) is provided as an separate body from the head box (50) so as to support a power unit (30). A front wheel suspension device (4), which axially supports a front wheel (2), and the air cleaner box (52) are fixed on the main frame (18) through the fixing member (50a), which allows the head box (50) to be supported on the main frame (18).

According to an embodiment of the present invention, the air cleaner box (52) is disposed in front of the seat (36) on which the rider is seated with the radiator (66), for cooling the power unit (30), being mounted in front of the air cleaner box (52). The guide portion (52a) for guiding the exhaust air from the radiator (66) to the lower direction is formed on the air cleaner box (52).

According to an embodiment of the present invention, the straightening plate (69a) guiding the air stream of the exhaust air from the radiator (66) is provided in front of the guide portion (52a).

According to an embodiment of the present invention, the intake duct (63), which is connected to the head box (50) and opened to the front surface of the vehicle, is provided together with the air guiding passage forming portion (67), which is adjacent to an intake passage (63c) formed by the intake duct (63) and which forms the air guiding passage (67a) relative to the radiator (66).

According to an embodiment of the present invention, the radiator (66) is supported on the air cleaner box (52).

According to an embodiment of the present invention, the power unit (30) includes the engine (3) which has the cylinder (3b) on both sides of the crank case (3a). The main frame (18) has the right and left pair frame main bodies (18a), and both frame main bodies (18a) respectively extend so as to cross from above the cylinders (3b) to the rear direction and to bend in the side view.

According to an embodiment of the present invention, the air cleaner box (52) has the right and left flow passage forming portions (56). The flow passage forming portions (56) are respectively supported on the frame main bodies (18a).

According to an embodiment of the present invention, the air cleaner box provided on the head box is fixed on the main frame which has less vibration relative to the power unit without directly supported on the power unit. Accordingly, the quietness can be enhanced by suppressing the intake noise, compared to the case wherein the air cleaner box is directly supported on the power unit. The head box can lower the strength and rigidity requirement and reduce the weight of the vehicle without the input of the load from the front suspension device.

According to an embodiment of the present invention, the guide portion formed on the air cleaner box guides the exhaust air from the radiator to the lower direction, which controls the flow of the exhaust air from the radiator to the leg portion of the rider seating on the seat. In the structure, the heat can be hardly transmitted to the leg portion of the rider.

According to an embodiment of the present invention, the straightening plate guides the air stream of the exhaust air from the radiator. Accordingly, the guide portion of the air cleaner box can easily guide the exhaust air from the radiator to the lower direction, which can efficiently control the flow of the exhaust air from the radiator to the leg portion of the rider seating on the seat.

According to an embodiment of the present invention, the intake passage relative to the head box and the air guiding passage relative to the radiator are disposed so as to be adjacent to each other, which allow for effectively providing the intake passage and the air guiding passage.

According to an embodiment of the present invention, the radiator is supported on the air cleaner box. There is no need to separately provide a radiator supporting member, which allows for a reduce in the number of the parts.

According to an embodiment of the present invention, the right and left frame main bodies can support the crank case in the wide area while avoiding the right and left cylinders. Accordingly, the supporting rigidity of the engine can be increased, simultaneously, the engine can reinforce the main frame. Furthermore, the main frame can suppress the increase in the horizontal width.

According to an embodiment of the present invention, the right and left of flow passage forming portions of the air cleaner box are respectively supported on the right and left of frame main bodies. Accordingly, the air cleaner box can be supported with good balance. Simultaneously, the quietness of the intake noise can be improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
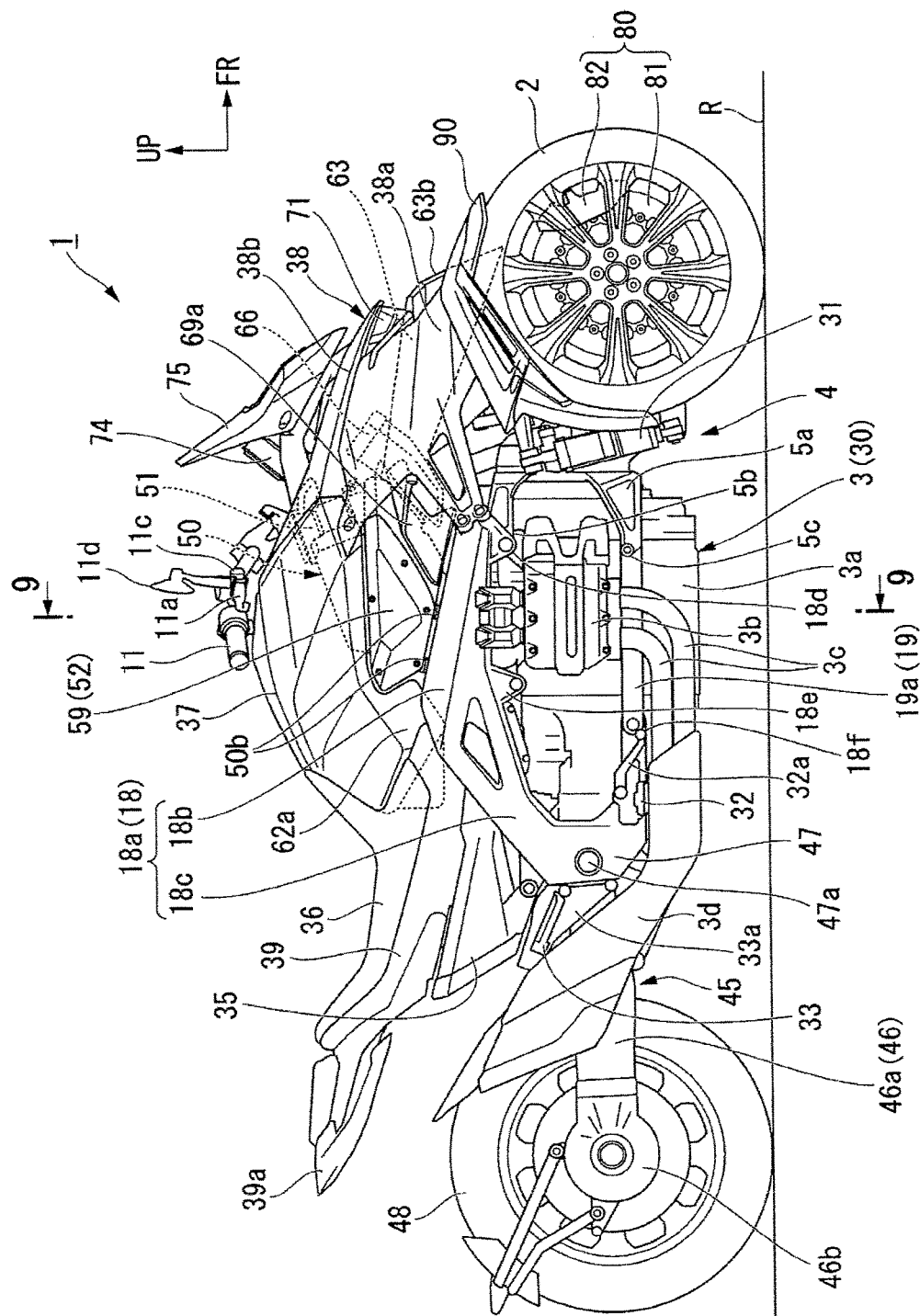
FIG. 1 is a right side view of the front two-wheeled straddle type vehicle in the embodiment of the present invention.

Hereinafter, with reference to the figures an embodiment of the present invention will be explained. Moreover, the directions including "front and rear", "right and left" will be same as the directions of the below-mentioned vehicle without any specific description. Furthermore, an arrow "FR" shows the front direction of the vehicle, an arrow "LH" shows the left direction of the vehicle, and an arrow "UP" properly shows the upper direction of the vehicle in the figures below-mentioned. A line "CL" in the drawings shows the horizontal center line of the vehicle body.

Figure 2:
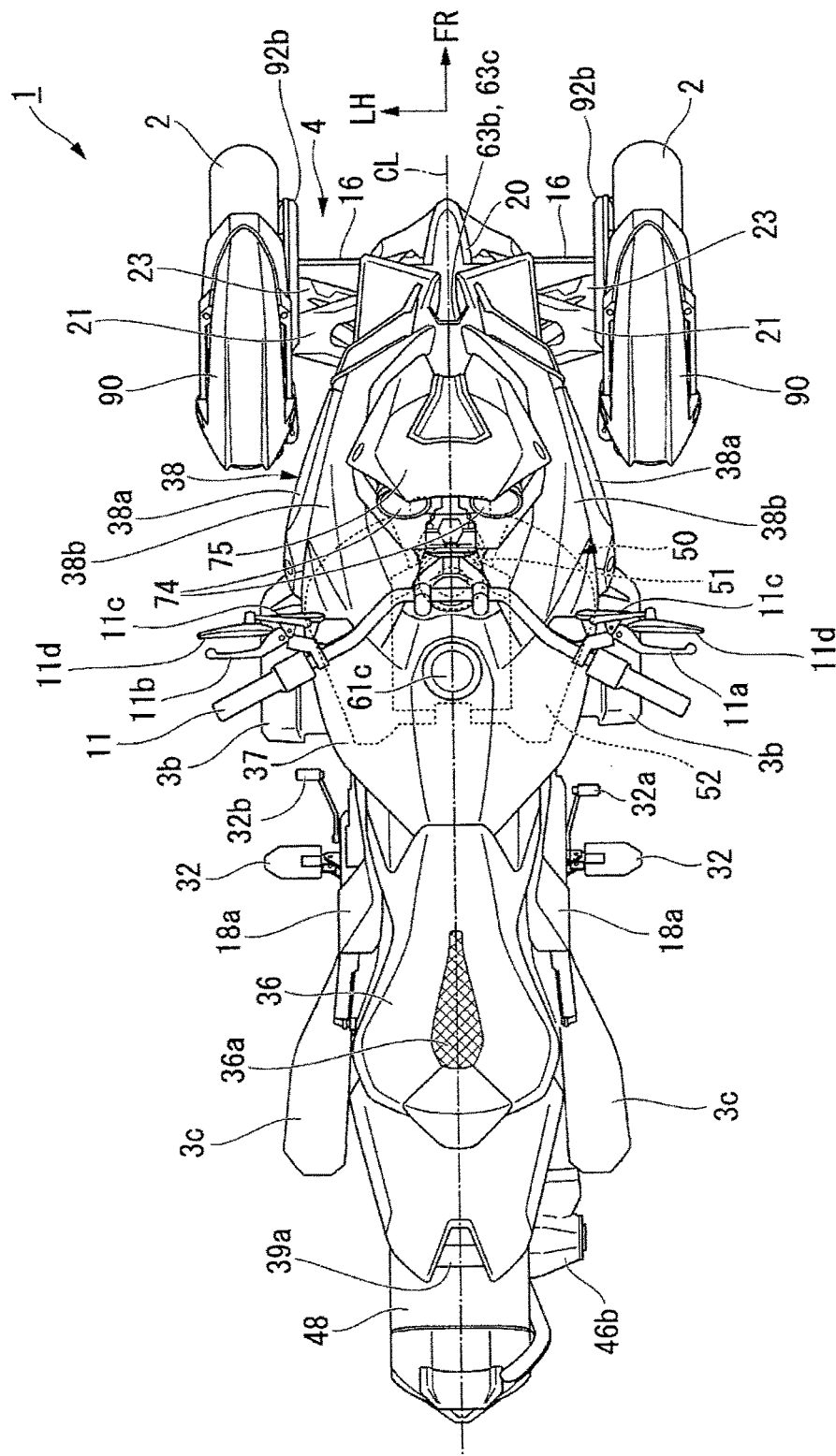
FIG. 2 is an upper view of the above-mentioned straddle type vehicle.
Figure 3:
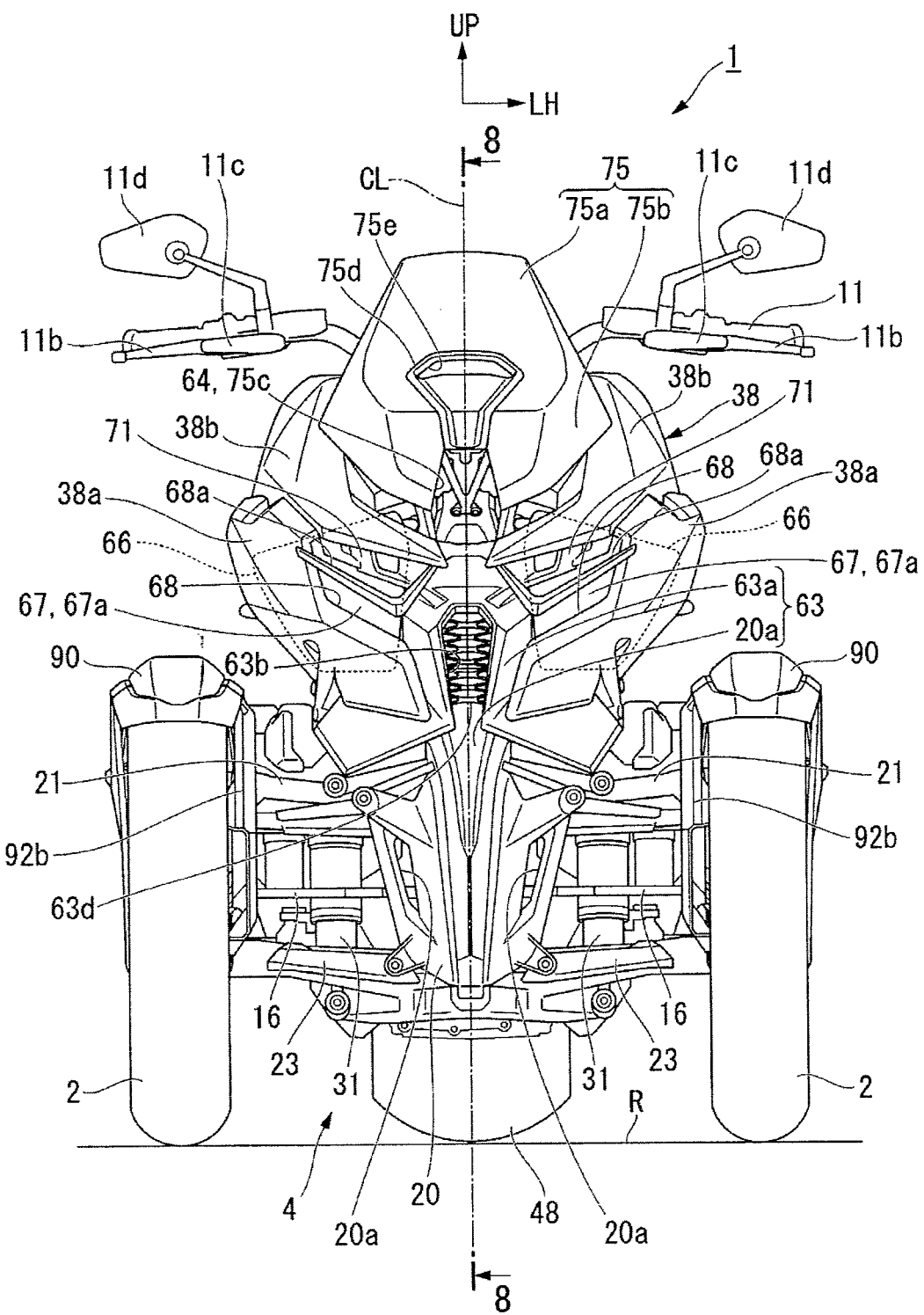
FIG. 3 is a front view of the above-mentioned straddle type vehicle.

As shown in FIGS. 1 to 3, in the present embodiment, a straddle type vehicle 1 is configured such that a three-wheeled swing type vehicle which has two front wheels 2 as the right and left pair of steering wheels on the front portion of the vehicle body and also has a rear wheel 48 as a single driving wheel on the rear portion of the vehicle body. Simultaneously, the vehicle body can horizontally swing (can roll) in a state wherein the right and left front wheels 2 are touched on the ground.

Hereinafter, the configuration is explained in the state wherein the right and left front wheels 2 touch on the horizontal road surface R, in a 1 G state wherein the same load as the vehicle weight are dividedly applied on the front wheels 2 and the rear wheel 48, in a state wherein the vehicle body vertically stands when the horizontal swing angle becomes 0 degree, in a straight steering state wherein the steering angle of the right and left front wheels 2 becomes 0 degree. The below-described configuration is symmetrical relative to the horizontal center of the vehicle body unless there is specific description.

Figure 8:
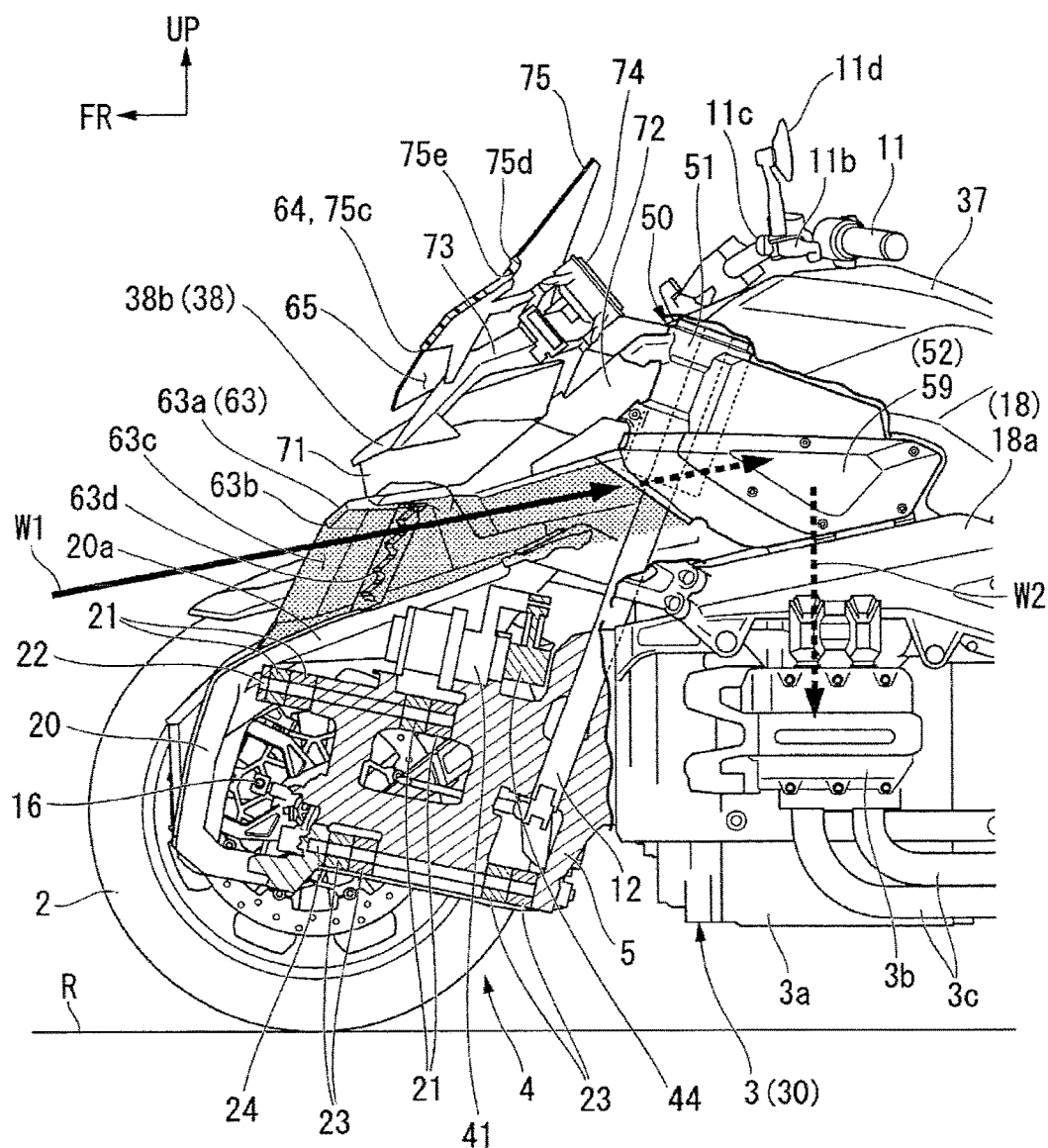
FIG. 8 is a sectional view taken along a line 8-8 in FIG. 3.
Figure 9:
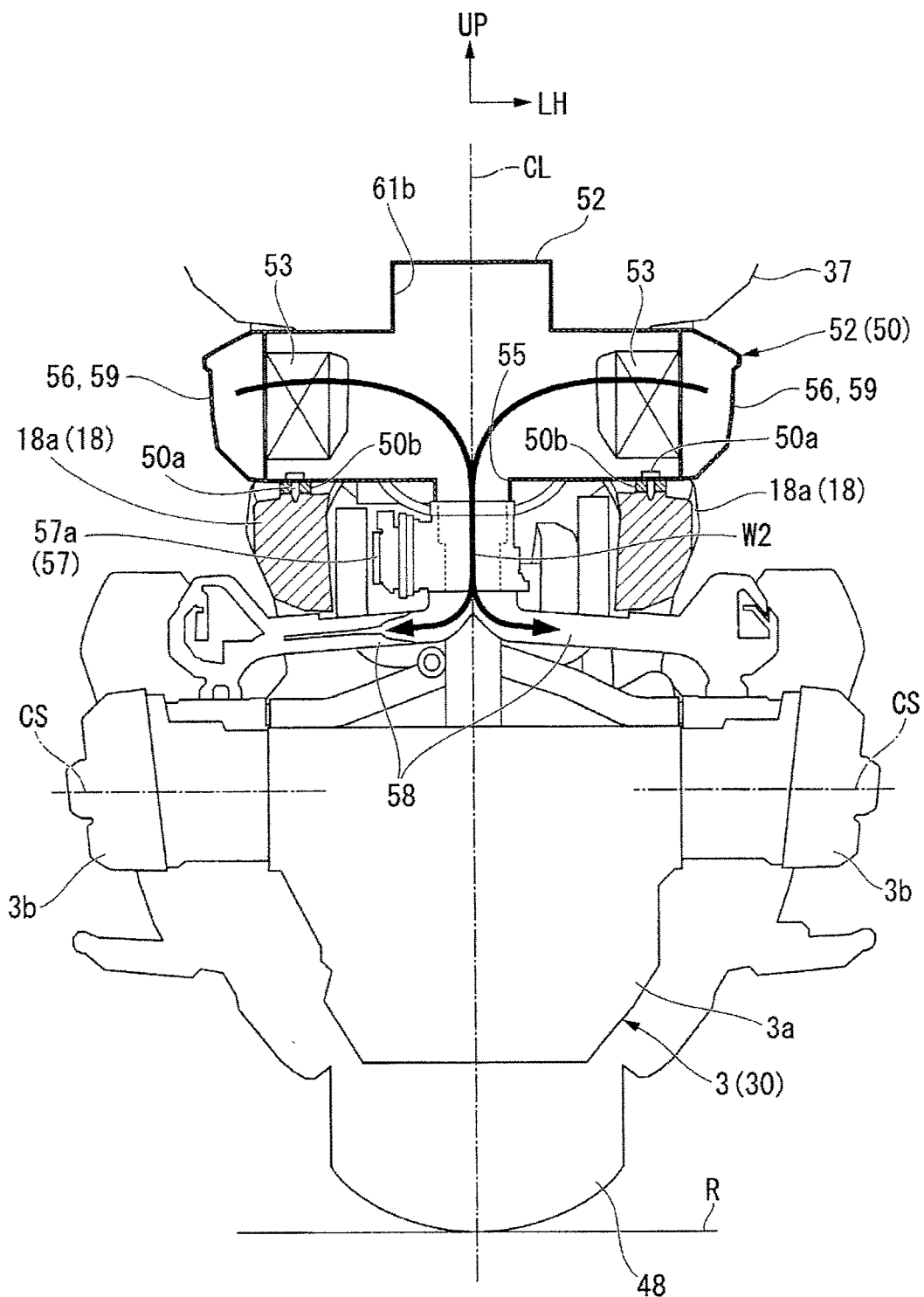
FIG. 9 is a sectional view taken along a line 9-9 in FIG. 1.

With reference to FIGS. 8, 9, the straddle type vehicle 1 is configured such that a front suspension frame body 5 supporting a front two-wheeled suspension device 4 is attached to the front portion of a power unit 30 which is mounted on the center of the vehicle body. For example, the power unit 30 includes a horizontally opposed four-cylinder type engine 3. The engine 3 is configured such that right and left cylinders 3b project on both sides of a crank case 3a positioned on the center in the horizontal direction of the vehicle. Exhaust pipes 3c are derived below the right and left cylinders 3b. The exhaust pipes 3c are bent and extend in the rear direction. Exhaust mufflers 3d are disposed on both sides of the rear portion of the vehicle body. The rear end portion of the exhaust pipes 3c are connected to the front end portion of the exhaust mufflers 3d. A line CS in FIG. 9 shows a center axis of the right and left cylinders 3b.

With reference to FIG. 1, the front suspension frame body 5 is attached to the front portion of the crank case 3a of the engine 3 through a mount frame 5a. The mount frame 5a has right and left pair upper and lower mount portions 5b, 5c above and below thereof The upper and lower mount portions 5b, 5c are combined with the upper portion and lower portion of the front portion of the crank case 3a, respectively.

A main frame 18 supporting the power unit 30 is disposed on the part from the upper direction in the rear direction of the crank case 3a. A seat frame 35 is connected in the rear direction of the main frame 18. A seat 36 is supported on the seat frame 35 on which a rider is seated. A fuel tank 37 is disposed in front of the seat 36. A front body cover 38 is attached to the front portion of the vehicle body. A rear body cover 39 is attached to the rear portion of the vehicle body. A ventilation hole 36a is provided on the horizontal center portion of the seat 36 so as to be formed in a mesh-shape and allow the ventilation with the space below the seat 36.

A pivot portion 47 supporting a front end portion of a swing arm 46 of a rear wheel suspension device 45 is provided on a rear portion of a main frame 18. The pivot portion 47 vertically and swingably supports a front end portion of the swing arm 46 through a horizontally extending pivot shaft 47a. The swing arm 46 is a cantilever type, for example which only has a right arm 46a. A final gear box 46b is connected to the rear end portion of the right arm 46a of the swing arm 46. A rear wheel 48 is axially supported on the left side of the final gear box 46b. An unillustrated drive shaft is inserted into the right arm 46a so as to connect the rear wheel 48 and the power unit 30.

The main frame 18 has right and left pair frame main bodies 18a. The frame main body 18a has a longitudinally extended portion 18b longitudinally extended above the crank case 3a, a vertically extended portion 18c vertically extended behind the crank case 3a. The main frame 18 has a cross frame on proper places, which connects between right and left frame main bodies 18a.

Front and rear mount portions 18d, 18e respectively project downwardly and are provided below the front portion and the middle portion of the horizontally extending portion 18b of a frame main body 18a. An upper end portion of the crank case 3a is supported on the front and rear mount portions 18d, 18e, respectively. The front mount portion 18d and an upper mount portion 5b of a mount frame 5a are connected to the main frame 18a. Accordingly, the front portion of the main frame 18 and the upper portion of the mount frame 5a are connected.

A rear lower mount portion 18f projecting frontward is provided on the front side of the lower portion of the vertically extended portion 18c of the frame main body 18a. The rear lower end portion of the crank case 3a is supported on the rear lower mount portion 18f.

A lower frame 19 is disposed between the rear lower mount portion 18f and the lower mount portion 5c of the mount frame 5a. The lower frame 19 has a right and left pair of lower beams 19a which extend longitudinally. The lower beams 19a are linearly provided so as to longitudinally cross the lower outside of the crank case 3a below the lower portion outside of a cylinder 3b. The lower beams 19a connects between the rear lower mount portion 18f of the main frame 18 and the lower mount portion 5c of the mount frame 5a on both outsides of the crank case 3a. The main frame 18, the mount frame 5a, and the lower frame 19 form right and left pair closed loop structures on both outsides of the power unit 30.

Right and left main steps 32 supported on the lower portion front side of the pivot portion 47 is disposed below the front portion of the seat 36. A brake pedal 32a is disposed in the vicinity of the right main step 32. A shift pedal 32b is disposed in the vicinity of the left main step 32. A pillion step 33 which is supported on the rear portion of the pivot portion 47 through a pillion step stay 33a is disposed below the rear portion of the seat 36.

Figure 19:
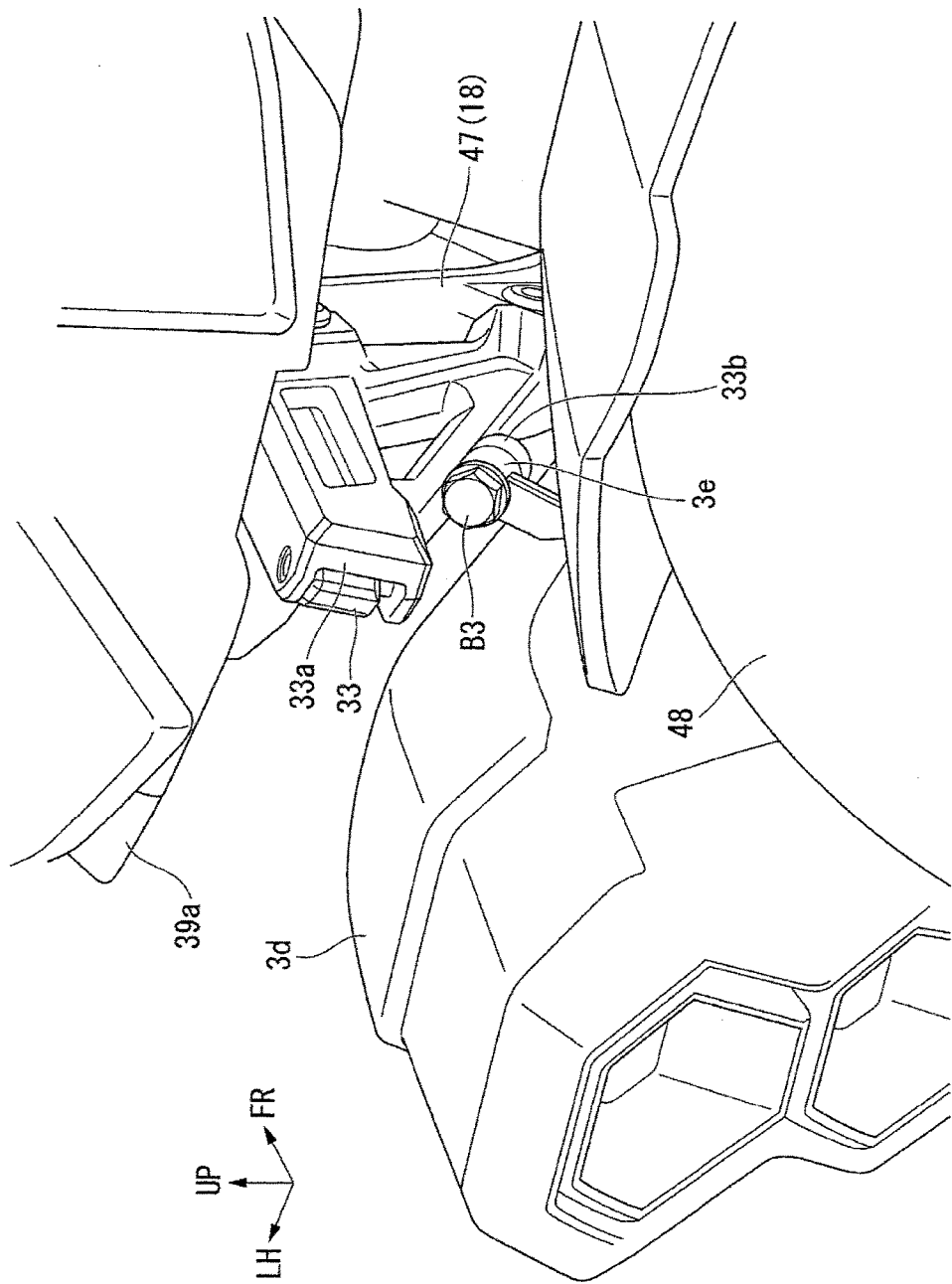
FIG. 19 is a perspective view of a fastening portion of an exhaust muffler.

The pillion step stay 33a supports the exhaust muffler 3d by fastening in the radial direction. With reference to FIG. 19, specifically, a cylindrical stay side fastening portion 33b is provided so as to rise rearwardly on the lower portion of the pillion step stay 33a. Simultaneously, a cylindrical muffler side fastening portion 3e which is coaxial with the stay side fastening portion 33b is provided on the upper portion of the exhaust muffler 3d. The respective fastening portions 33b, 3e are fastened to each other by a bolt B3 parallel to the radial direction of the rear wheel 48 (orthogonal to the axial direction of the rear wheel 48). Accordingly, the bolt B3 supporting the exhaust muffler 3d is downsized and inconspicuous.

With reference to FIG. 8, a lower portion of a steering shaft 12 vertically extends in the horizontal center of the vehicle body (center in the width direction of the vehicle) and is rotatably supported on the front suspension frame body 5. A bar-type steering handle 11 is integrally and rotatably installed on the upper end portion of the steering shaft 12. The upper portion of the steering shaft 12 is rotatably supported on a head pipe 51 as described below with respect to the head box 50.

The steering shaft 12 is positioned on the horizontal center line of the vehicle body CL and faces to the inside of the rear portion of the front suspension frame body 5. An unillustrated steering link mechanism is disposed in front of the lower end portion of the steering shaft 12. The steering link mechanism is connected to right and left knuckle members 26 through right and left tie rods 16. The right and left front wheels 2 are axially supported on the right and left knuckle members 26, respectively. The steering link structure, which includes the steering shaft 12, the steering link mechanism, the right and left tie rods 16, and the right and left knuckle members 26, is linked to rotation of the steering handle 11 and the steering of the right and left front wheels 2.

With reference to FIGS. 3, 8, the front two-wheeled suspension device 4 is configured such that the vehicle body including the front suspension frame body 5, the power unit 30, and the like can move horizontally and swingably while the right and left front wheels 2 are touched on the ground, and the right and left front wheels 2 also can move horizontally and swingably corresponding to the horizontal oscillation of the vehicle body. On the contrary, the front two-wheeled suspension device 4 is configured such that the right and left front wheels 2 can alternately and vertically move relative to the vehicle body.

The front two-wheeled suspension device 4 has a double wishbone mode which independently suspends the right and left front wheels 2. The front two-wheeled suspension device 4 supports outer link members 25 on both sides of the front suspension frame body 5 extending in front of the steering shaft 12 at the center in the width direction of the vehicle through an upper arm 21 and a lower arm 23, respectively. The right and left knuckle members 26 and the right and left front wheels 2 are steerably supported on the right and left outer link members 25, respectively.

An inside end portion of right and left upper arms 21 positioned at the center in the width direction of the vehicle is supported so as to be vertically swingable on the upper portion of the front suspension frame body 5 through an upper swing shaft 22 longitudinally extending upwardly in the front direction. The inside end portion of the right and left upper arms 21 are alternately disposed in the axial direction.

The inside end portion of the right and left lower arms 23 are positioned at the center in the width direction of the vehicle and are supported so as to be vertically swingable, on the lower portion of the front suspension frame body 5 through a lower swing shaft 24 parallel to the upper swing shaft 22. The inside end portion of the right and left lower arms 23 are alternately disposed in the axial direction.

Figure 10:
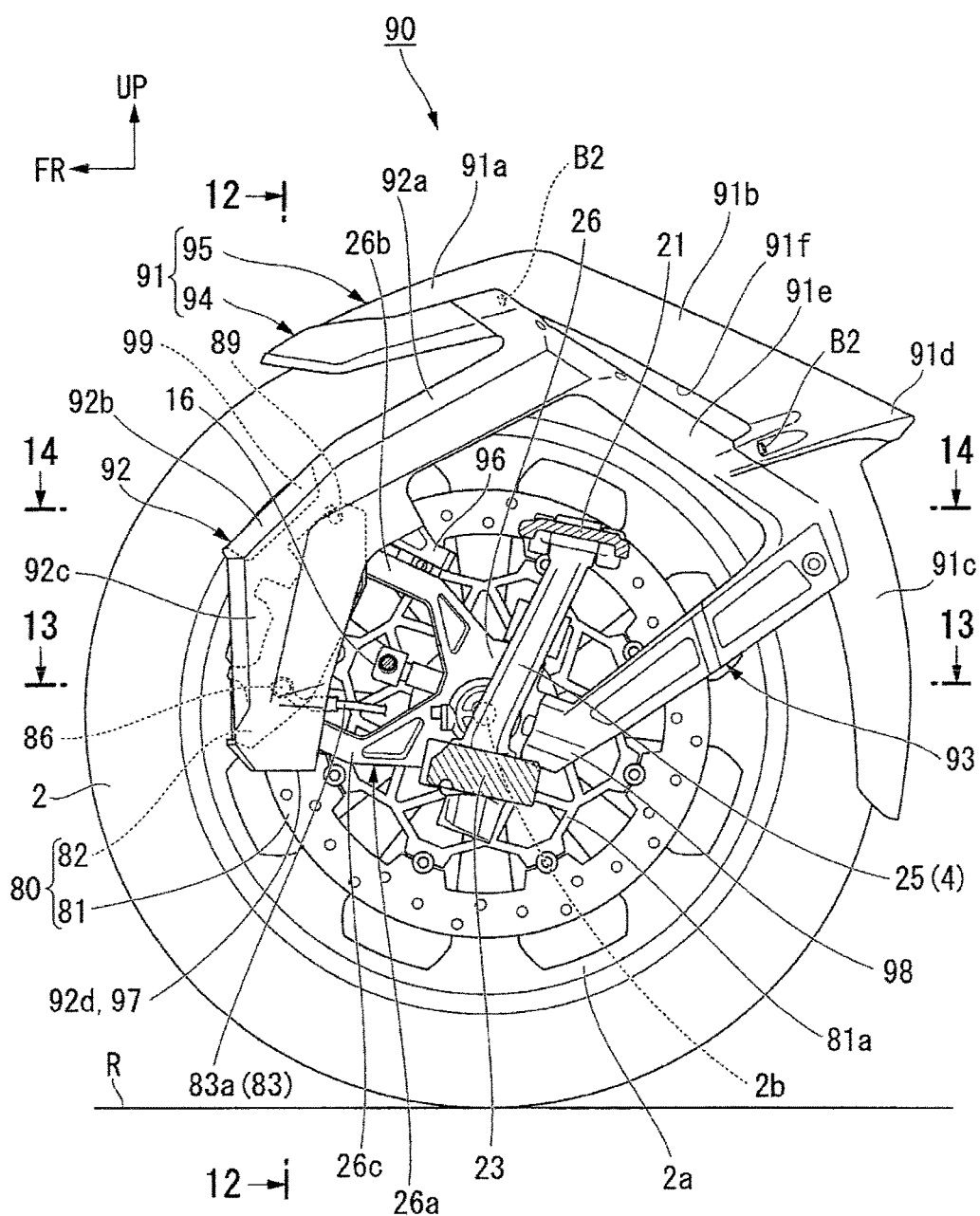
FIG. 10 is a left side view of the right front wheel seen from the inside in the width direction of the vehicle of the above-mentioned straddle type vehicle.

With also reference to FIG. 10, the upper end portion of the right and left outer link members 25 is swingably supported on the outside end portion of the right and left upper arms 21 through an upper outer swing shaft (not shown) parallel to vertical swing shafts 22, 24. The lower end portion of right and left outer link members 25 are swingably supported on the outside end portion of the right and left lower arms 23 through a lower outer swing shaft (not shown) parallel to the vertical swing shafts 22, 24.

The right and left upper arms 21, the right and left lower arms 23, and the right and left outer link members 25 are disposed on both sides of the vehicle body in a parallel linked state. Accordingly, when the right and left upper arms 21 and the right and left lower arms 23 vertically swing, the right and left outer link members 25, the right and left knuckle members 26, and the right and left front wheels 2 vertically move so as to be approximately parallel.

With reference to FIG. 8, a front link cover 20 is installed on the front end portion of the front suspension frame body 5 which extends vertically. The front end portion of the vertical swing shafts 22, 24 are supported on the front link cover 20. A flow of air guiding hole 20b is formed so as to enhance the cooling performance of the power unit 30 on both sides of the front link cover 20.

With reference to FIGS. 1 and 3, right and left shock absorbers 31 respectively receive the loads on the right and left front wheels 2 approximately extend vertically above the rear portion of the right and left lower arms 23. The shock absorber 31 is inclined such that the upper side is positioned on the rear side relative to the vertical direction and is disposed so as to extend perpendicular to the upper and lower swing shafts 22, 24, in the side view. The shock absorber 31 is disposed so as to be approximately vertical in the front view.

The lower end portion of the right and left shock absorbers 31 are connected to the right and left lower arms 23, respectively. With reference to FIG. 8, the upper end portion of the right and left shock absorbers 31 are connected to right and left end portions of integral shock absorber supporting arm 44 which extend to approximately in a horizontal direction, respectively. The horizontal center portion of the shock absorber supporting arm 44 is swingably supported on the front suspension frame body 5 through a shock absorber swing shaft (not shown) parallel to the upper and lower swing shafts 22, 24. An actuator 41 for controlling the inclination angle of the vehicle body is connected to the shock absorber supporting arm 44.

Figure 4:
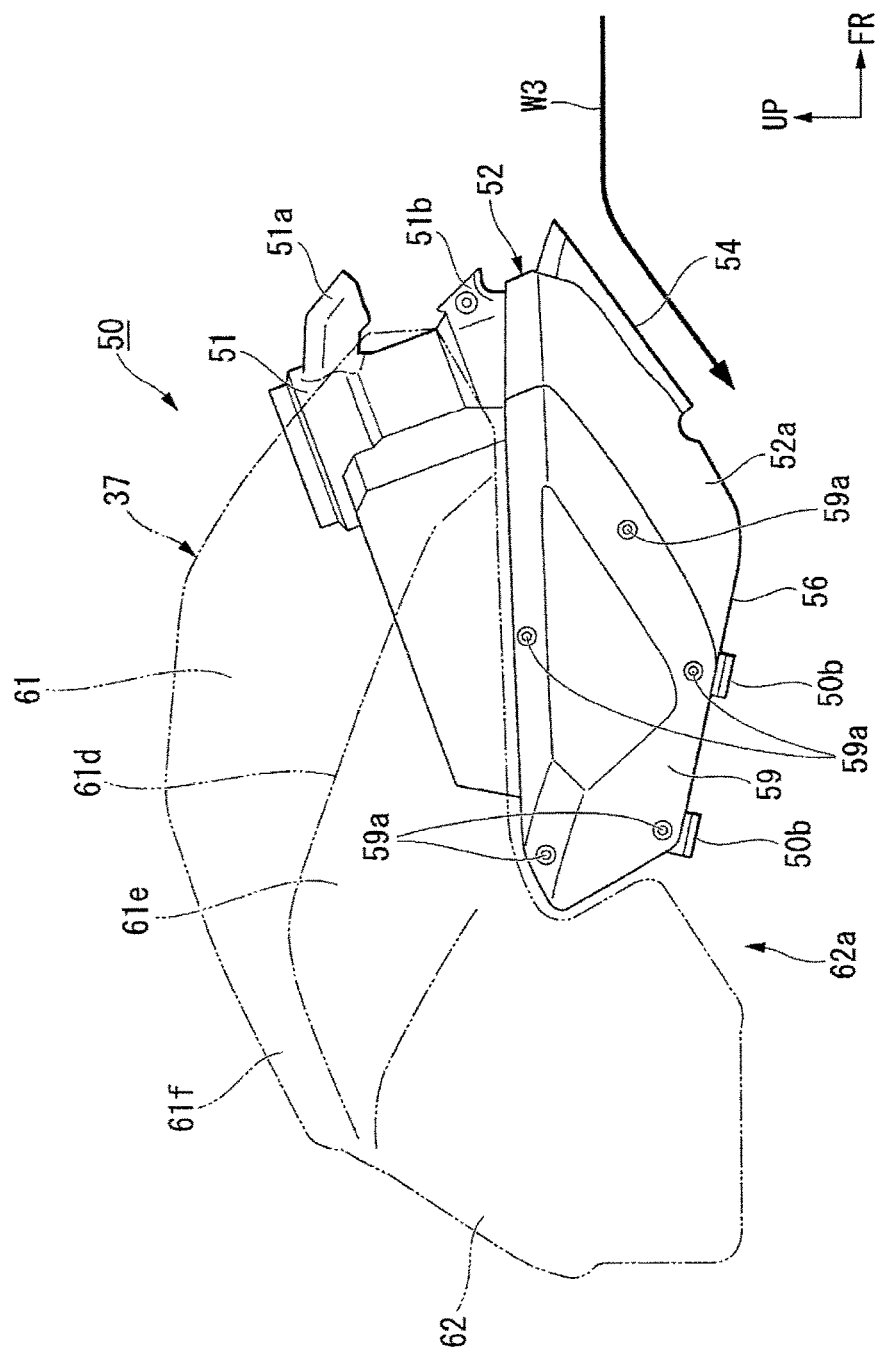
FIG. 4 is a right side view of the head box in the above-mentioned straddle type vehicle.
Figure 5:
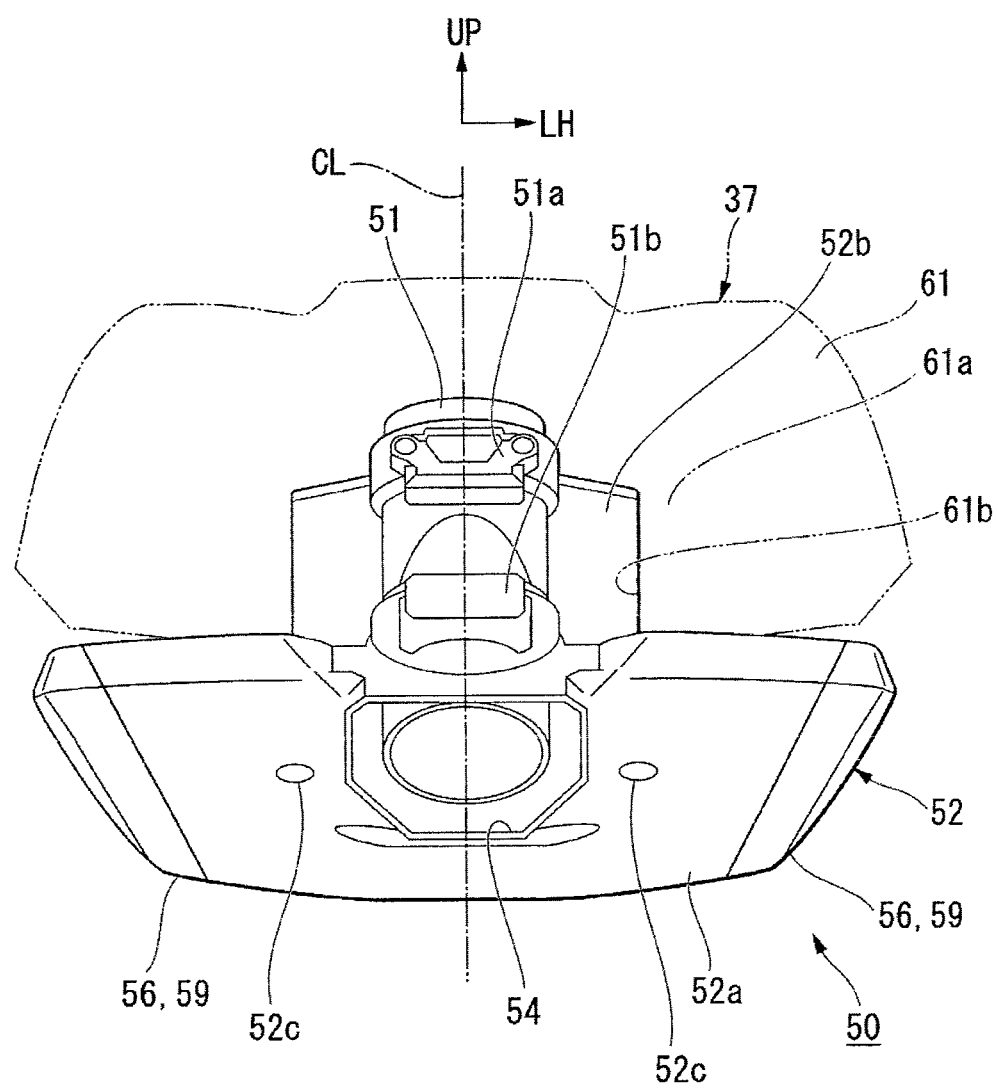
FIG. 5 is a front view of the above-mentioned head box.
Figure 6:
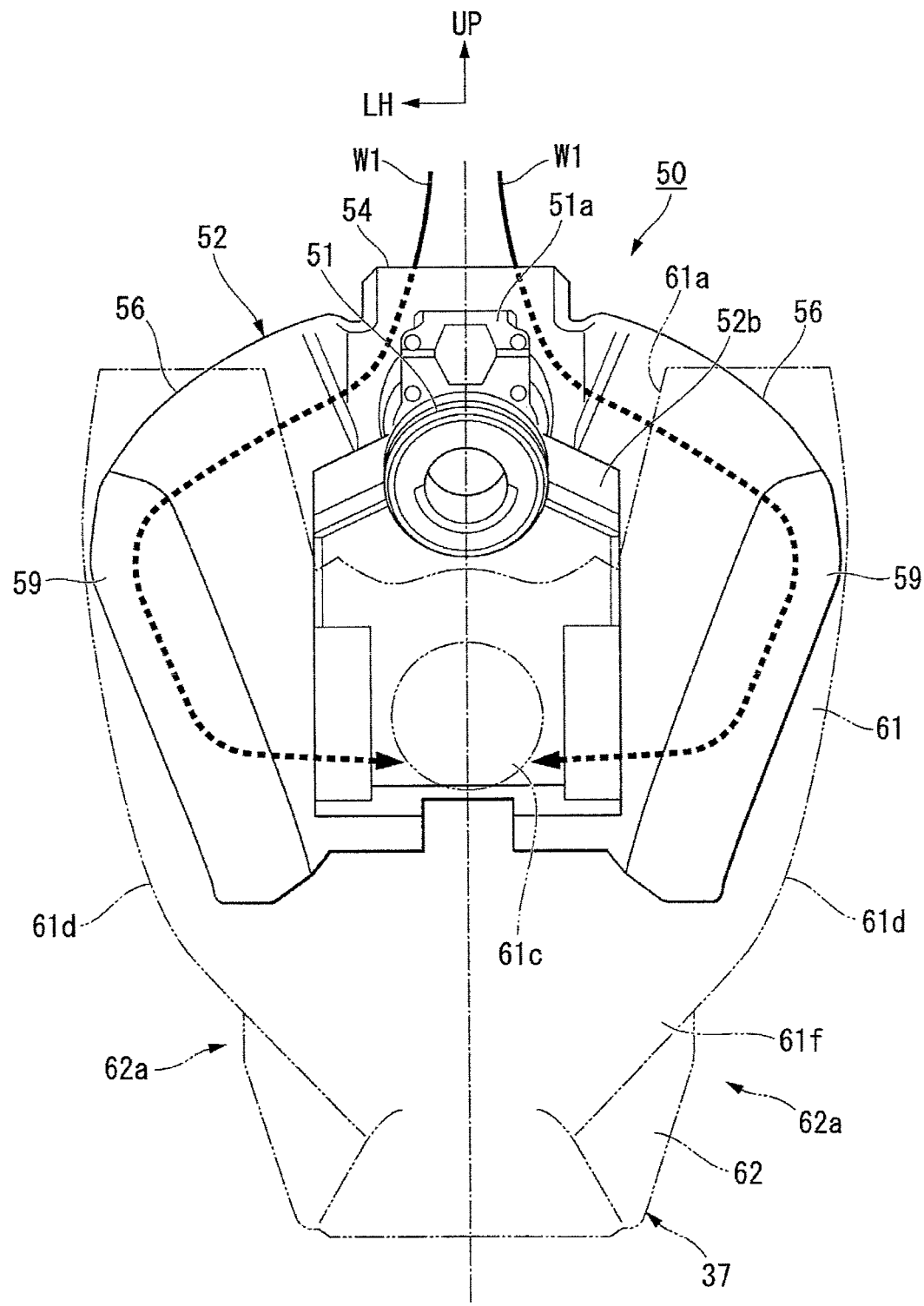
FIG. 6 is an upper view of the above-mentioned head box.

With reference to FIG. 1, the head box 50 is disposed between the fuel tank 37 and the engine 3. With reference to FIGS. 4 to 6, the head box 50 has the head pipe 51 and an air cleaner box 52. The head box 50 has a different form from the main frame 18, and is fixed on the upper surface of the longitudinally extending portion 18b of the right and left frame main bodies 18a of the main frame 18 through a plurality of fixing members 50a. For example, the fixing members 50a are fastening bolts, and fix a below-described lower wall portion 50b of a flow passage forming portion 56 of the air cleaner box 52 on the main frame 18 by the fastening operation from the inside of the air cleaner box 52.

The head box 50 is an integrally molded article by casting made from an aluminum alloy, for example. The head box 50 can decrease the strength rigidity without the input of the loads from the front two-wheeled suspension device 4 and the rear wheel suspension device 45, and can reduce in weight of the vehicle with a hollow structure like the air cleaner box 52. For example, the head box 50 can be made by resin. The head box 50 in the present embodiment is configured such that the air cleaner box 52 and the head pipe 51 are integrally formed. However, it may be configured such that a plurality of members are integrally connected by welding or fastening and the like.

The head box 50 comprises the flat air cleaner box 52 which with the suppressed vertical width. With also reference to FIG. 9, the air cleaner box 52 contains right and left pair elements 53 inside the right and left side portions thereof. An intake air inlet 54 opened to the front and lower direction in the vicinity of the lower end portion of the head pipe 51 is formed on the front end portion of the air cleaner box 52. In other words, the lower end portion of the head pipe 51 is disposed on the intake air inlet 54 formed on the front end portion of the air cleaner box 52. An intake air outlet 55 guiding the outside air which passed through the element 53 to the engine 3 side is formed on the rear lower end portion of the air cleaner box 52.

As shown by an arrow W1 in FIGS. 6 and 8, the outside air (the intake air) entering from the intake air inlet 54 to the inside of the air cleaner box 52 is bifurcated into right and left in the air cleaner box 52 and flows rearwardly, and flows to the right and left elements 53, respectively. Moreover, the portion which forms the flow passage in the upstream side (dirty side) of the elements 53 of the right and left side portions of the air cleaner box 52 are called the flow passage forming portion 56.

Inside the air cleaner box 52, the outside air flowing to the right and left elements 53 is passed and is filtered through the right and left elements 53 and flows to the clean side on both insides of the air cleaner box 52 and joins each other. With reference to FIG. 9, the outside air reaches the clean side inside the air cleaner box 52 is guided from the intake air outlet 55 opened to the lower wall portion on both the inside of the air cleaner box 52 to a downstream intake passage 57 connected in the lower direction of the intake air outlet. The downstream intake passage 57 includes a throttle body 57a, and has an unillustrated fuel injection valve. The downstream intake passage 57 is connected to the inlet port of the respective cylinders through a manifold 58. As shown by an arrow W2 in FIGS. 8 and 9, the intake air flowing to the downstream intake passage 57 is supplied to the respective cylinders of the engine 3 with the fuel corresponding to the throttle operation by the rider.

With reference to FIGS. 4 to 6, the outside portion of the flow passage forming portion 56 of the air cleaner box 52 is set as a cover 59 which is removable with a plurality of fastening screws 59a relative to the box main body. The detachable cover 59 enables the maintenance of the element 53 by detaching and so on. The cover 59 is exposed in the side direction of the vehicle between the main frame 18 and the fuel tank 37, and forms a part of the outer appearance of the vehicle. The front wall portion of the air cleaner box 52 including the cover 59 is inclined so as to be positioned lower as it goes to the rear side. The front wall portion functions as a guide portion 52a sends the flow of air which is passed through the radiator 66 described below obliquely downward in the rear direction as shown by an arrow W3 in FIGS. 4 and 7. In FIG. 5 a radiator supporting portion 52c is illustrated.

A swelling portion 52b has an approximately rectangular parallelepiped shape and is formed so as to swell in the upper direction than the upper wall portion of both the outsides (the dirty side, the flow passage forming portion 56) on the upper wall portion of right and left inside (the clean side) of the air cleaner box 52. The swelling portion 52b increases the capacity in the clean side of the air cleaner box 52, simultaneously projects in the upper direction than the upper wall portion in the dirty side (the flow passage forming portion 56), and supports the upper portion of the head pipe 51 from the rear direction.

With reference to FIGS. 4 to 6, the fuel tank 37 for reserving the fuel of the engine 3 is supported on the head box 50. The fuel tank 37 is provided so as to cover the head box 50 from above in the rear direction. The fuel tank 37 has a tank front portion 61 covering the head box 50 from above, and a tank rear portion 62 covering the head box 50 from behind.

The tank front portion 61 is formed in a flat shape with a suppressed vertical width, and in a slightly broader horizontal width than the horizontal width of the box. A front concaved portion 61a is opened in the front direction so as to avoid the periphery of the upper end of the head pipe 51 and is formed on the tank front portion 61. A lower concaved portion 61*b* is opened downwardly so as to match the swelling portion 52*b* of the head box 50 from above and is formed on the lower portion of the tank front portion 61. The head box 50 and the fuel tank 37 are relatively located by matching the swelling portion 52*b* and the lower concaved portion 61*b*. A fuel filler opening 61*c* is formed at the horizontally center of the upper portion of the tank front portion 61.

A ridge line portion 61*d* rising rearwardly is formed on both side portions of the tank front portion 61. Simultaneously, an inclined wall 61*e* is formed on both side portions of the tank front portion so as to be inclined and extended and positioned to both insides as it approaches downwardly from the ridge line portion 61*d* in the rear direction. A rearwardly extended portion 61*f* is provided in the rear direction of the tank front portion 61 so as to extend further rearwardly than the rear end of the head box 50. The ridge line portion 61*d* is inclined so as to be positioned on both insides as it approaches to the rear side in the plan view of the rearwardly extended portion 61*f*, and is inclined and extended downwardly in the rear direction in the side view of the rearward extended portion 61*f*.

The tank rear portion 62 is formed so as to narrow the horizontal width relative to the ones of the tank front portion 61 and the head box 50, so as to facilitate the driver's knee grip. The right and left covers 59 of the head box 50 are inclined so as to be approximately parallel to an inclined wall 61*e* of the tank front portion 61. The tank rear portion 62, the right and left inclined walls 61*e* of the tank front portion 61, and the right and left covers 59 of the head box 50 forms a knee grip portion 62*a* sandwiched by both knees of the rider.

With reference to FIGS. 3 and 8, an inclined wall 20*a* rising rearwardly extends rearwardly in the upper direction from the upper end portion of the front link cover 20 of the front suspension frame body 5. The inclined wall 20*a* is connected to the lower end portion of the intake air inlet 54 of the head box 50, while avoiding the steering shaft 12. A duct main body 63*a* extends upwardly in the rear direction above the inclined wall 20*a* so as to be along the inclined wall 20*a*. The duct main body 63*a* is connected to the upper end portion and both end portions of the intake air inlet 54 of the head box 50.

The inclined wall 20*a* and the duct main body 63*a* are combined each other with a rectangular shape in the cross section, and form an intake duct 63 which extends from an intake opening 63*b* on the front surface of the vehicle to the intake air inlet 54 of the head box 50. The intake duct 63 forms an intake passage 63*c* linearly extending upwardly in the rear direction at the center in the width direction of the vehicle. A net-like grill 63*d* is disposed inside the front portion of the intake duct 63.

A notching portion 75*c* and the like of a screen 75 described below form an upper intake opening 64 above the intake opening 63*b*. An upper air guiding passage 65 is formed in the rear direction of the upper intake opening 64 so as to be along the upper wall portion of the intake duct 63. The upper air guiding passage 65 suppresses the negative pressure by introducing the flow of air to the rear direction of the screen 75.

Figure 7:
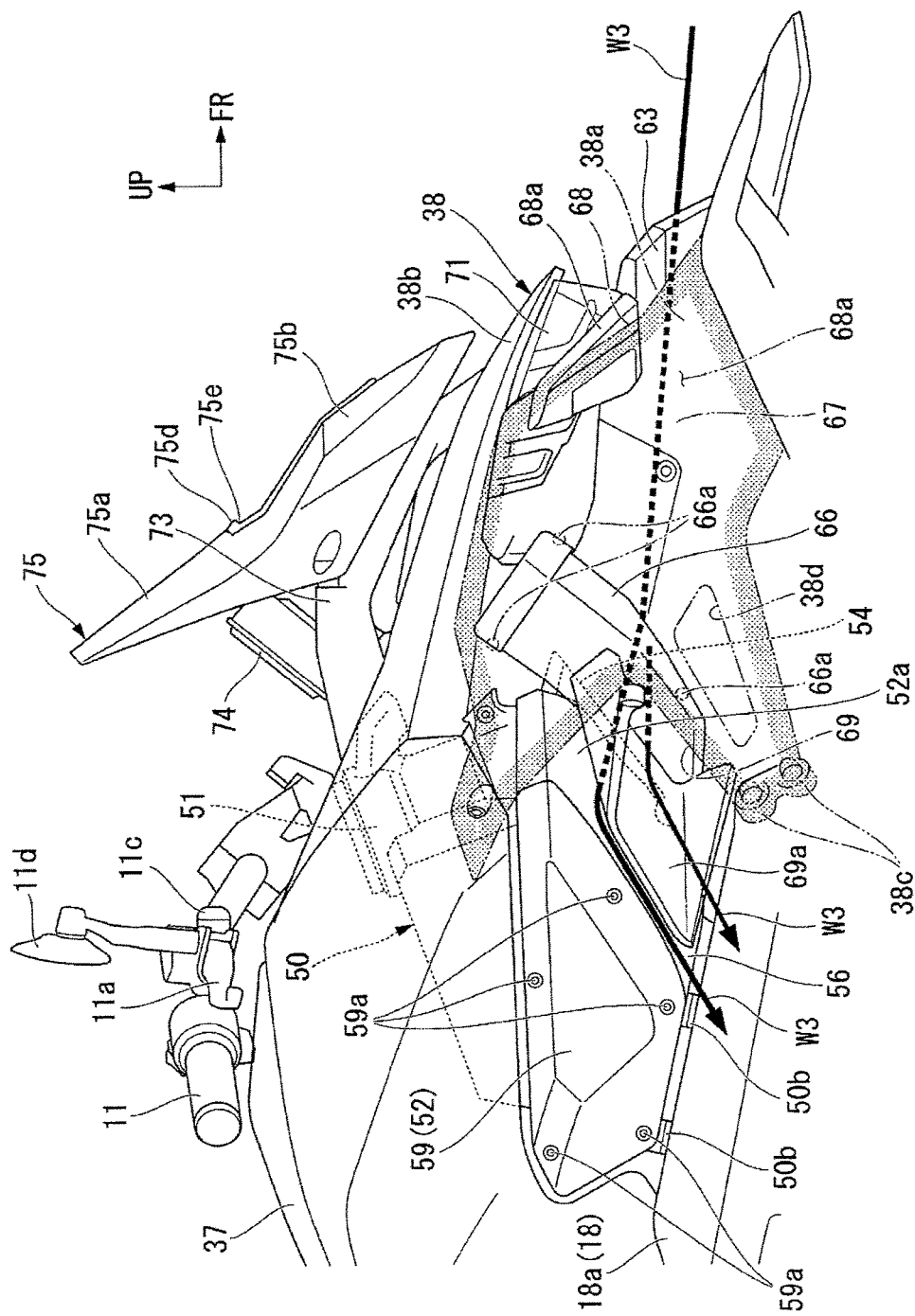
FIG. 7 is a right side view in the vicinity of the head box in the above-mentioned straddle type vehicle.

With reference to FIGS. 3 and 7, the right and left radiators 66 for cooling the engine 3 are disposed in front of the head box 50 and on both sides of the intake duct 63. The radiators 66 are configured such that the core front surface faces in the front direction. The radiators are inclined so as to be positioned further towards the front side as it approaches to the upper side in the side view, and simultaneously so as to be positioned in the front of side as it approaches to the horizontally outsides in the plan view. The radiator 66 has supported portions 66*a* on the right and left of the upper potion and lower portion, respectively.

Figure 20:
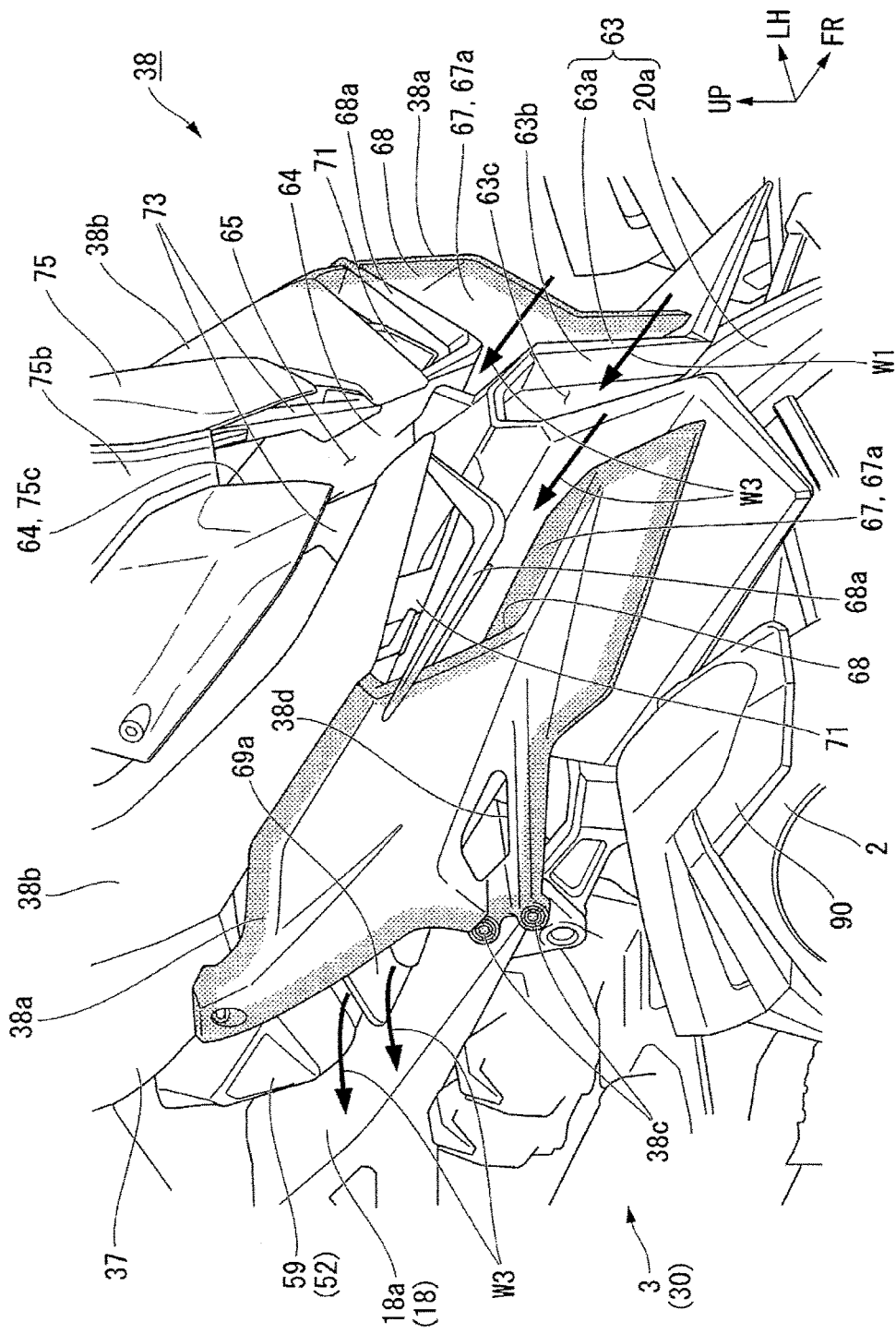
FIG. 20 is a perspective view in the vicinity of the front body cover.

With also reference to FIG. 20, an air guiding passages 67*a* for supplying the flow of air to the radiator 66 are formed on both sides of the intake duct 63 inside the front vehicle body cover 38, respectively. An outside air inlet 68 to the air guiding passage 67*a* is formed on both sides of the upper portion of the intake opening 63*b* in the front surface of the vehicle. A louver 68*a* forming a V-shape in the front view is disposed on the outside air inlet 68. A head lamp unit 71 is disposed in the upper direction than the louver 68*a* in the air guiding passage 67*a*.

The front body cover 38 has right and left pair front side cowls 38*a* covering the periphery of the intake duct 63 from the side direction, and right and left pair front upper cowls 38*b* covering the space between the right and left front side cowls 38*a* and the intake duct 63 from above. The front body cover 38 is formed so as to widen the horizontal width as it approaches to the rear side, and is formed broader than the fuel tank 37 at the rear portion of the front body cover.

The front upper cowl 38*b* extends from the right and left front end portion of the tank front portion 61 of the fuel tank 37 in the front direction. The front end portion of the front upper cowl 38*b* is bent and extends to both insides. The front end portion of the right and left front upper cowls 38*b* are spaced apart each other so as to avoid the upper intake opening 64.

The radiator 66 is disposed inside the front side cowl 38*a*. An air guiding passage forming portion 67 forming the air guiding passage 67*a* relative to the radiator 66 comprises the front side cowl 38*a*, the front upper cowl 38*b*, and the duct main body 63*a* of the intake duct 63. The rear portion of the front side cowl 38*a* forms an exhaust port 69 which is opened rearwardly and exhausts the outside air passed through the radiator 66 to the rear direction. A sign 38*c* shows a supporting portion relative to the main frame 18, and a sign 38*d* shows a lightened portion of the front side cowl 38*a*, respectively.

The guide portion 52*a* of the head box 50 is disposed in the rear direction of the discharge port 69 so as to be separated rearwardly. Accordingly, the outside air passed through the radiator 66, is exhausted from the discharge port 69 and is guided rearwardly to the lower direction along the guide portion 52*a*. A straightening plate 69*a* guiding the air stream of the exhaust air is attached to the discharge port 69. The straightening plate 69*a* divides the exhaust air shown by the arrow W3 in FIG. 7. This facilitates the guiding of the outside air by the guide portion 52*a*.

With reference to FIGS. 4 to 6, upper and lower mount portions 51*a*, 51*b* project on the front end portion of the head pipe 51. With reference to FIG. 8, a supporting frame 72 supporting auxiliary parts is installed on the upper and lower mount portions 51*a*, 51*b*. The right and left pair head lamp units 71, which use a light source such as LED, are supported on the front end portion of the supporting frame 72. The head lamp unit 71 includes a headlight and a daylight. Moreover, the right and left blinkers 11*c* are disposed (see, FIGS. 2, 3 and 7) on both sides of the steering handle 11, respectively. Signs in the drawings show the parts as below, respectively. A sign 11*d* shows a rear-view mirror supported on both sides of the steering handle 11. A sign 11*a* shows a brake lever disposed on the right grip of the steering handle 11. A sign 11*b* shows a clutch lever disposed on a left grip of the steering handle 11. A tail lamp unit 39a is disposed on the rear end portion of the rear body cover 39 (see, FIGS. 1 and 2).

Right and left pair support beams 73 forming a convexly bending shape in the upper direction in the side view are disposed above the supporting frame 72. The support beam 73 extends so as to straddle between the upper mount portion 5b of the head pipe 51 and the housing of the right and left head lamps and is fixed to the upper mount portion and the housing. A meter unit 74 is supported on the rear portion of the right and left support beams 73. Right and left end portions of the screen 75 are supported on both outsides of the top portion of the support beam 73.

With reference to FIGS. 3, and 7, the screen 75 integrally has a trapezoid-type of screen upper potion 75a and a reverse trapezoid-type screen lower portion 75b in the front view.

A screen upper potion 75a is inclined and linearly extends so as to be positioned on a further rearward side as it approaches to the upper side in the side view. The screen upper potion 75a extends more in the upper direction than the front upper cowl 38b.

The screen lower portion 75b is inclined so as to be positioned on a further rearward side as it approaches to the upper side in the side view, and is formed in a convexly bending shape in the front and upper direction. The notching portion 75c opened downwardly is formed on the horizontally center lower side of screen lower portion 75b. The notching portion 75c forms the upper portion of the upper intake opening 64.

For example, an opaque duct portion 75d is provided on the center portion of the screen 75 relative to the transparent or translucent screen main body. The duct portion 75d forms a ventilation hole 75e through which the flow of air passed in the rear direction of the screen upper potion 75a. Simultaneously, the duct portion supports the screen 75 relative to the right and left support beams 73 and a meter unit 74.

Figure 11:
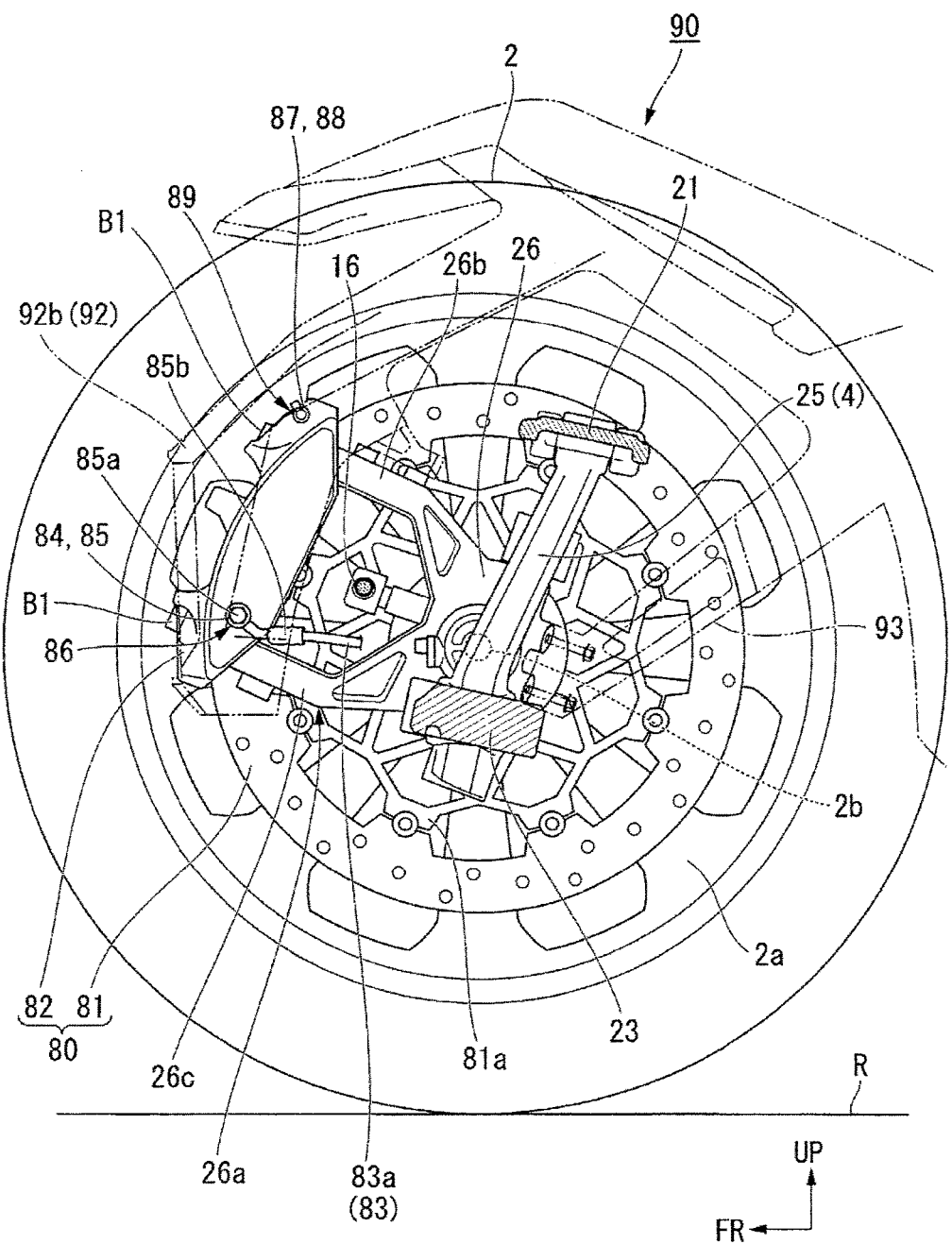
FIG. 11 is an enlarged view of the main parts in FIG. 10.
Figure 12:
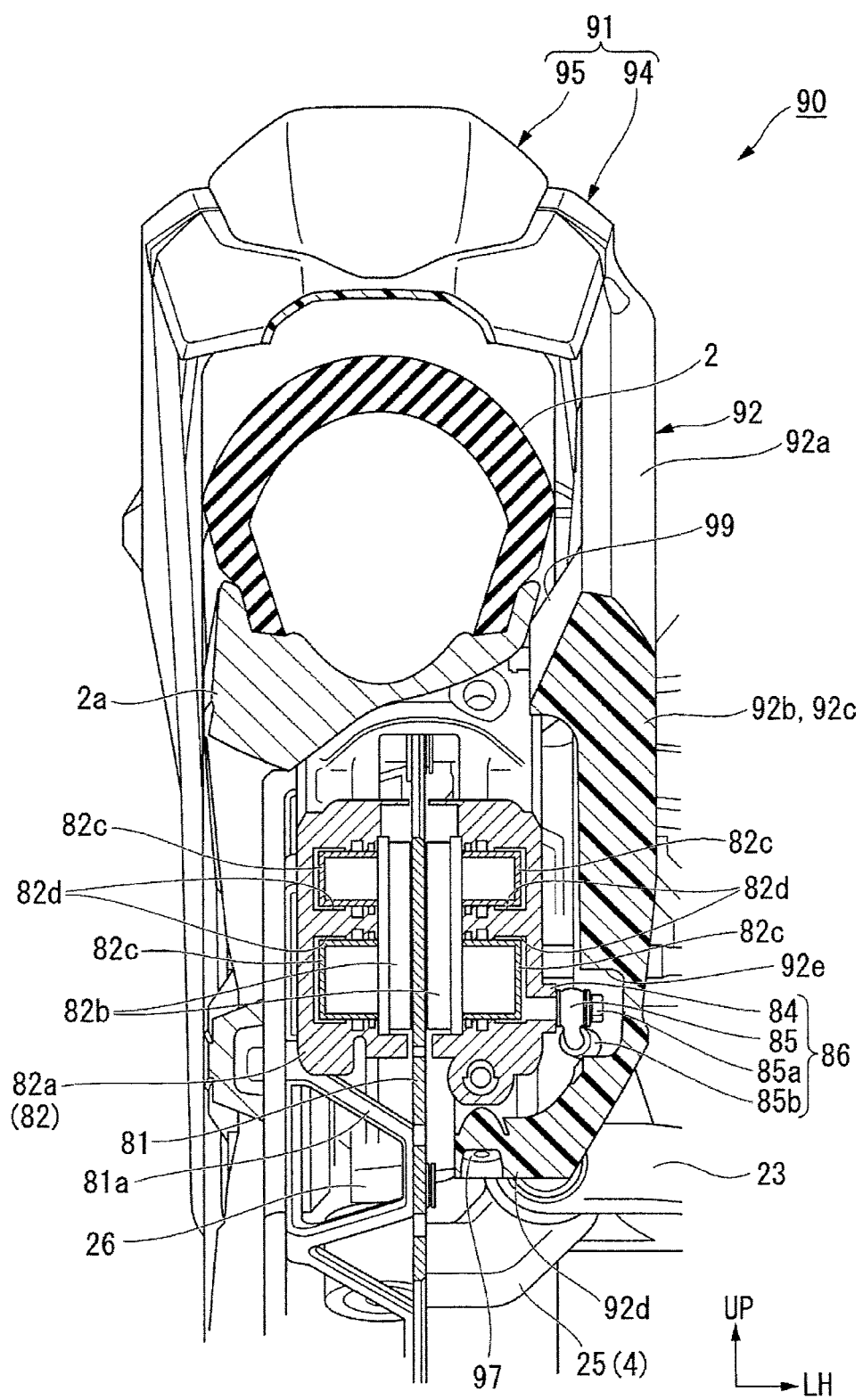
FIG. 12 is a sectional view taken along a line 12-12 in FIG. 10.

With reference to FIGS. 10 to 12, each front wheel 2 and an integrally rotatable brake disc 81 are disposed inside the wheels 2a opened to the inside in the width direction of the vehicle of each front wheel 2. A brake caliper 82, which can compress the brake disc 81, is supported on a caliper bracket 26a which is integrally formed on the front portion of the knuckle member 26 of each front wheel 2. A front wheel brake system 80 is configured with the brake disc 81 and the brake caliper 82 so as to apply the braking force on each front wheel 2. The brake disc 81 is supported on the front wheel 2 through an inner disk 81a.

A front wheel brake system 80 is a hydraulic pressure type (an oil pressure type) disk brake. For example, the hydraulic pressure is supplied to the brake caliper 82 from an unillustrated master cylinder supported on the steering handle 11 through a hydraulic pressure piping 83 including a brake hose 83a. The brake caliper 82 receives the supply of the hydraulic pressure, and compresses the brake disc 81 and brakes the front wheel 2. Moreover, the brake caliper may be configured such that the hydraulic pressure is supplied from brake modules including ABS module and the like to the brake caliper 82.

The brake caliper 82 is disposed inside the front side of the front wheel 2 (in front of an axle 2b) in the width direction of the vehicle. The brake caliper 82 has a caliper body 82a horizontally straddling the brake disc 81 from the outside of the brake disc 81 in the radial direction, right and left pair brake pads 82b held inside the caliper body 82a, and two pairs of right and left caliper pistons 82c pressing the right and left brake pads 82b and pressure welding on the brake disc 81. Two pairs of right and left cylinder chambers 82d are formed inside the caliper body 82a so as to form a hydraulic pressure chamber by movably fitting the caliper pistons 82c back and forth.

For example, a bolt B1 which are parallel (orthogonal to the rotation axis of the brake disc 81) to the radial direction of the brake disc 81 fastens and fixes the upper potion and the lower portion of the caliper body 82a (both side portions of the brake disc 81 in the rotation direction) to the front end portion of upper and lower stays 26b, 26c of the caliper bracket 26a. The brake caliper 82 is biased in the upper direction and is disposed relative to the front end portion of the brake disc 81 in the rotation direction of the disk. When the direction crossing the upper and lower fastening positions is set as the longitudinal direction, the brake caliper 82 is inclined so as to be positioned further rearwardly as it approaches to the upper side in the longitudinal direction.

Figure 13:
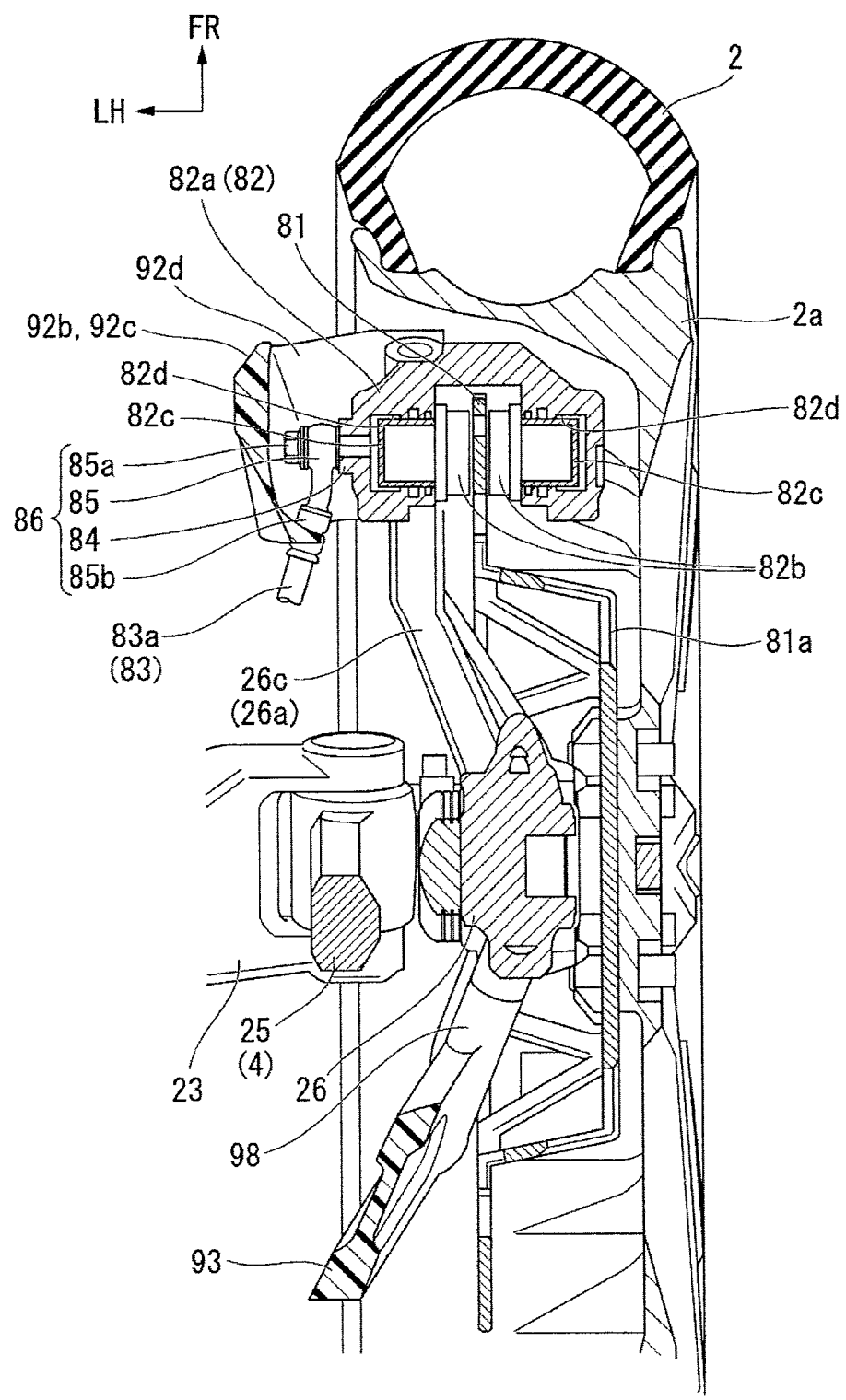
FIG. 13 is a sectional view taken along a line 13-13 in FIG. 10.

With reference to FIGS. 11 to 13, a charging and discharging boss 84 is projects on the lower portion of the side surface of the brake caliper 82 in the inside in the width direction of the vehicle so as to open a hydraulic pressure port which can charge and discharge the hydraulic pressure. A banjo 85 which connects the end portion of a brake hose 83a and a banjo bolt 85a which fastens the banjo to the charging and discharging boss 84 are installed on the charging and discharging boss 84. The banjo 85 extends such that a hose connector is faced in the rear direction. The banjo bolt 85a is provided so as to be parallel to the horizontal direction, and is screwed from both insides of the banjo 85. The banjo bolt fastens the banjo 85 to the charging and discharging boss 84. A connected portion 86 connecting the brake hose 83a of the brake caliper 82 comprises the charging and discharging boss 84, the banjo 85, and the banjo bolt 85a.

Figure 14:
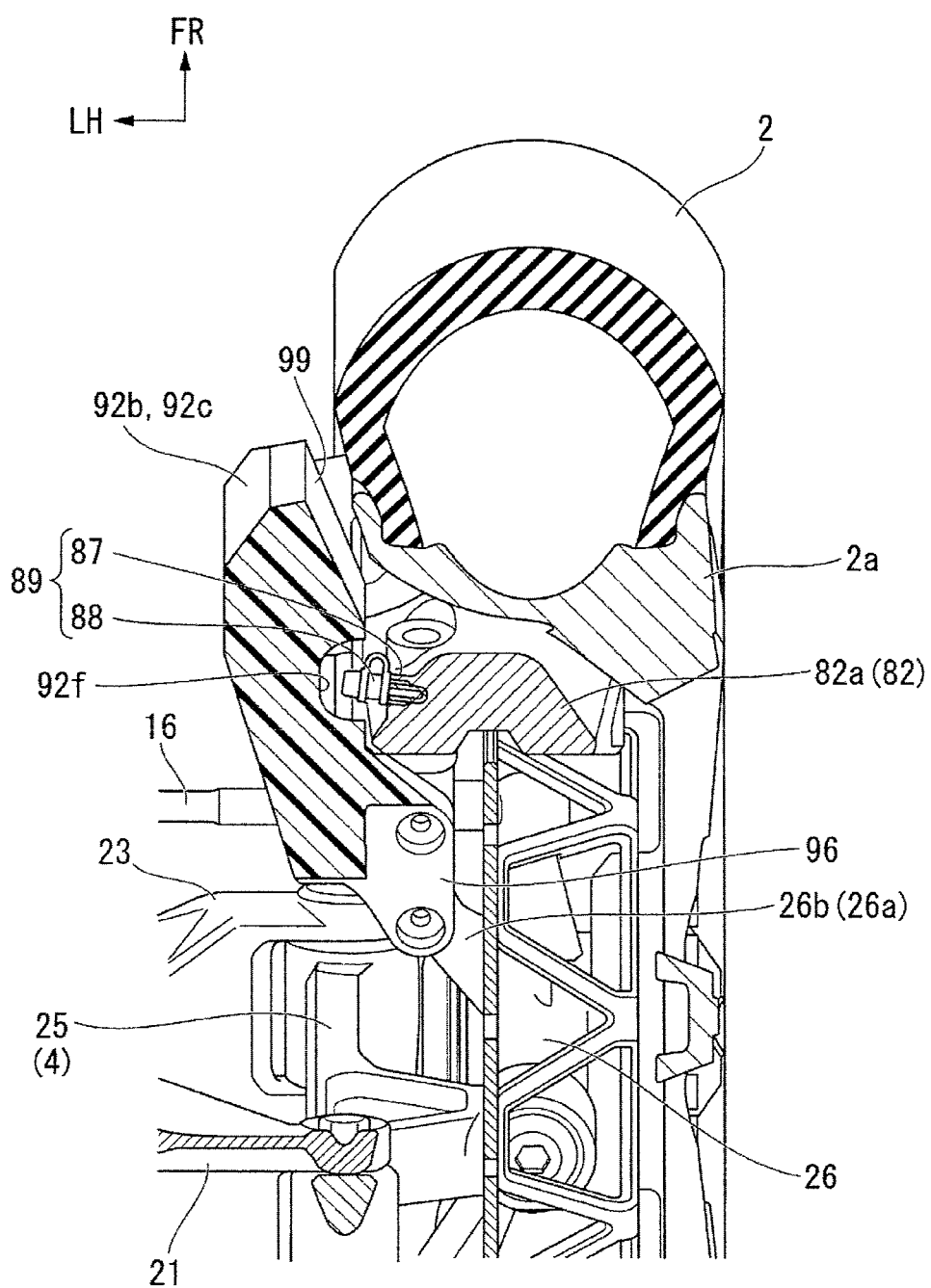
FIG. 14 is a sectional view taken along a line 14-14 in FIG. 10.
Figure 15:
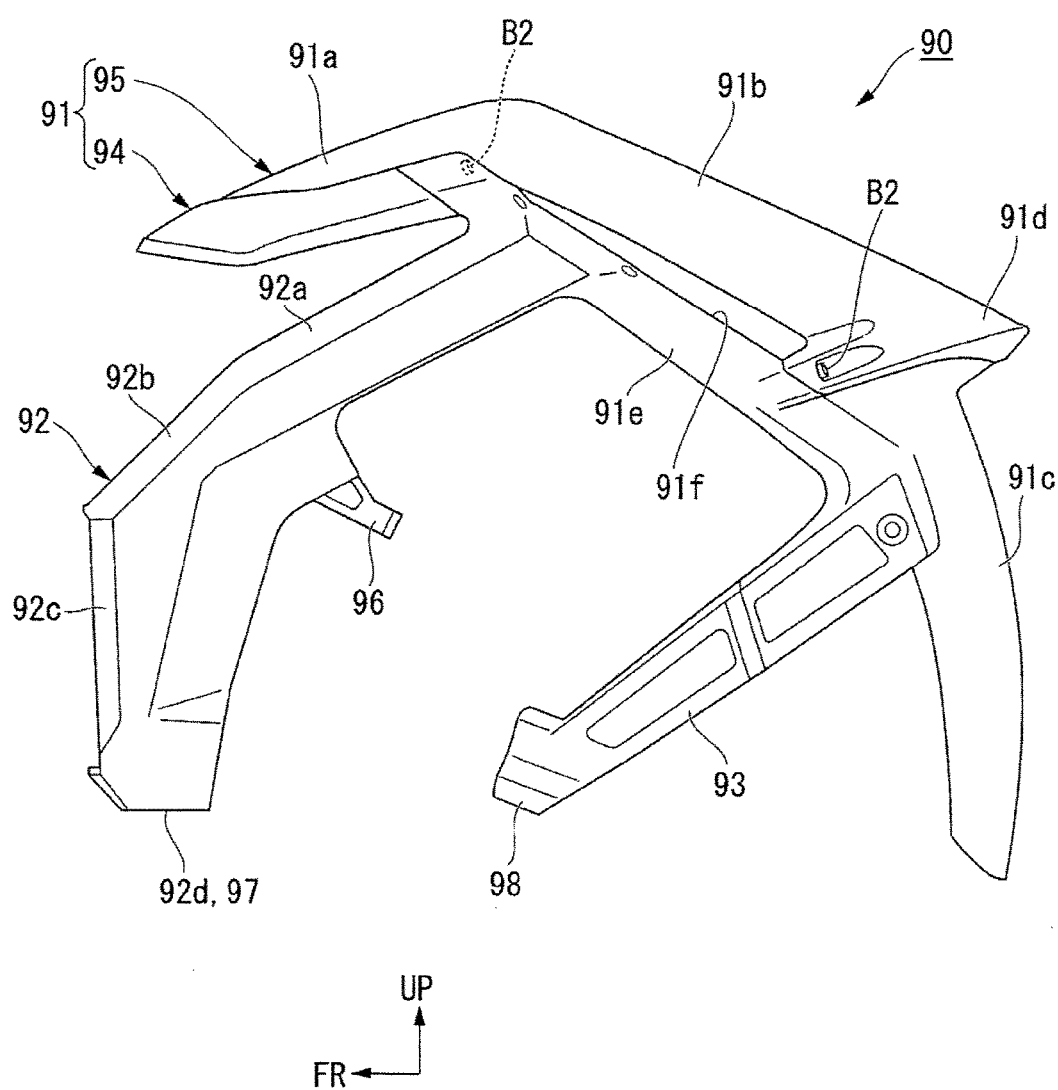
FIG. 15 is a left side view of a front fender of the above-mentioned right front wheel.
Figure 16:
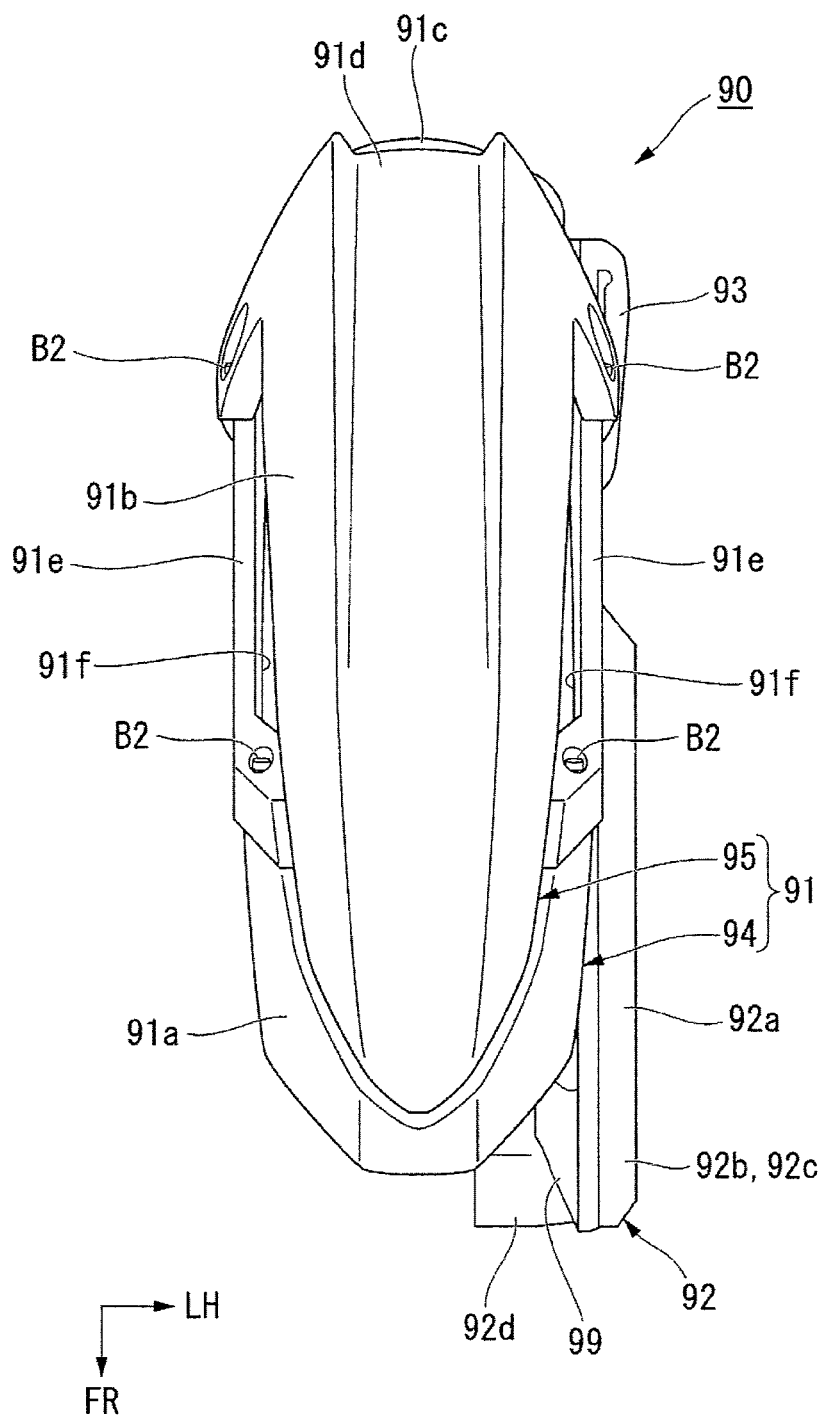
FIG. 16 is an upper view of the above-mentioned front fender.
Figure 17:
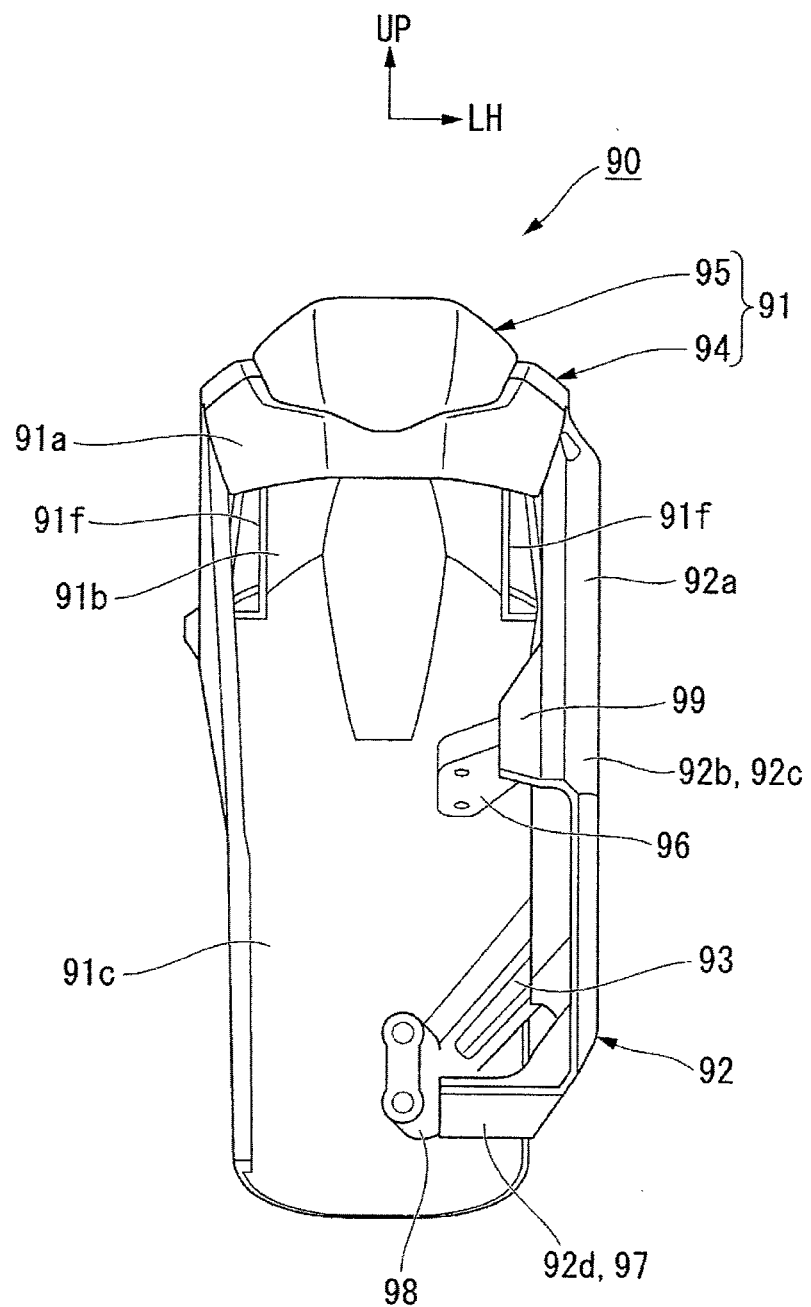
FIG. 17 is a front view of the above-mentioned front fender.
Figure 18:
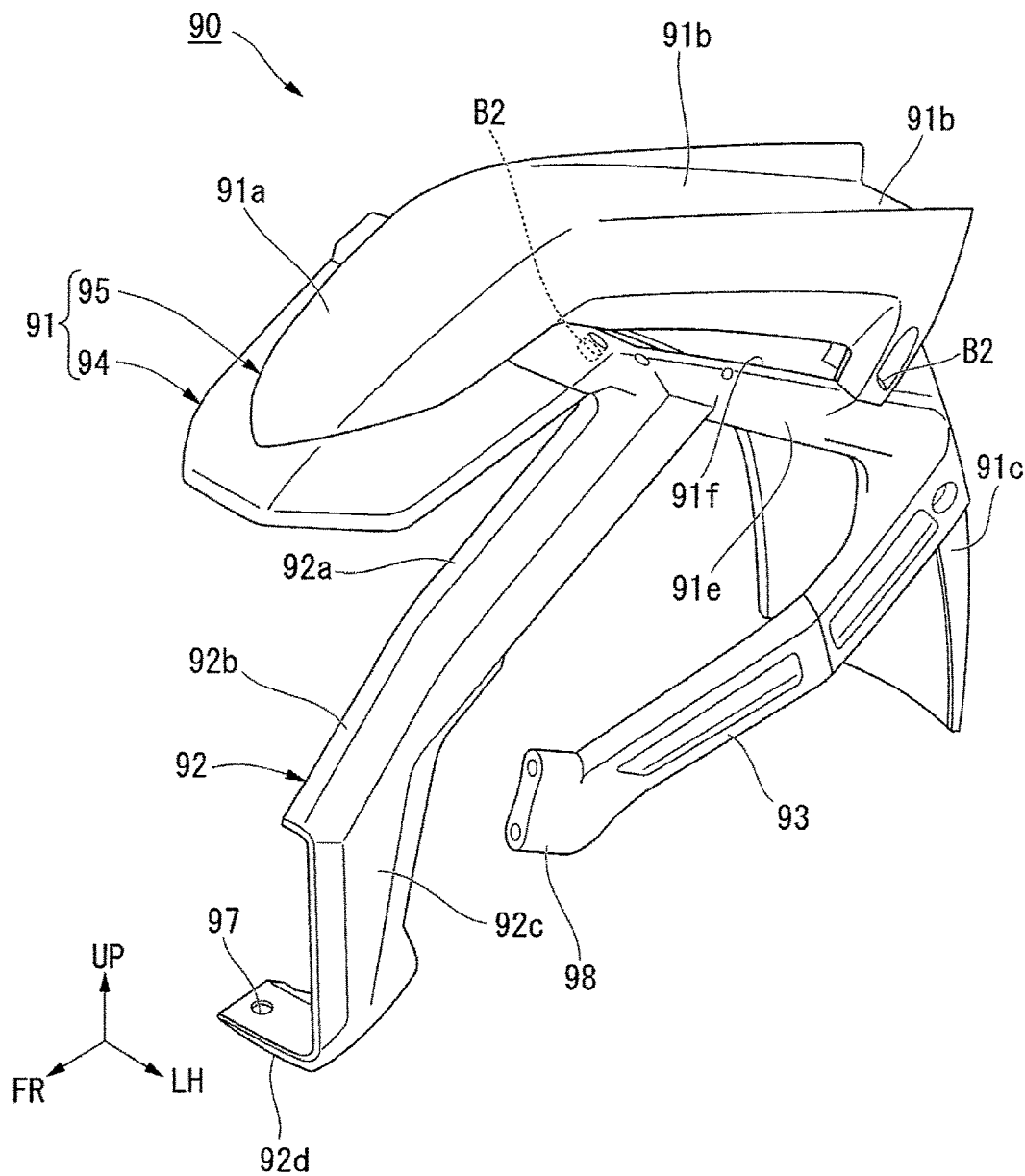
FIG. 18 is a perspective view of the above-mentioned front fender.

With reference to FIGS. 11 and 14, a bleeder boss 87 projects on the inside of the upper end portion of the brake caliper 82 in the width direction of the vehicle so as to open a drain hole (air vent hole). A bleeder bolt 88 is screwed on the bleeder boss 87. The bleeder bolt 88 is provided so as to be parallel to the horizontal direction and is screwed with the bleeder boss 87 from both insides of the bleeder boss 87. The bleeder boss 87 and the bleeder bolt 88 form a drain portion 89 projecting to the further outer direction (especially in the side direction) than the outer surface of the upper end portion of the caliper body 82a. A tip portion (including a cap) of the inside of the bleeder bolt 88 in the width direction of the vehicle projects to further be inside in the width direction of the vehicle relative to the side surface of the caliper body 82a in the width direction of the vehicle.

With reference to FIG. 10, a front fender 90 covering the outer periphery of the front wheel 2 is supported on the knuckle member 26 and the caliper bracket 26a. The front fender 90 has a fender main body 91 crossing from the upper portion of the front wheel 2 in the rear direction and covering the outer periphery, a front arm 92 extends from above the inside of the fender main body 91 in the width direction of the vehicle in the front and lower direction, a rear arm 93 extends from the rear portion of the inside of the fender main body 91 in the width direction of the vehicle in the front and lower direction. The front arm 92 is fastened to and fixed on the upper stay 26b of the caliper bracket 26a. The rear arm 93 is fastened to and fixed on the rear portion of the knuckle member 26.

The fender main body 91 has a fender front portion 91a inclined downwardly in the front direction and extends from the vicinity of the upper end portion of the front wheel 2 in the front direction, a fender middle portion 91b is inclined downwardly in the rear direction and extends from the vicinity of the upper end portion of the front wheel 2 in the rear direction, and a fender rear portion 91*c* vertically extends in the vicinity of the rear end of the front wheel 2. The fender front portion 91*a* and the fender middle portion 91*b* are linearly formed in the side view. The fender rear portion 91*c* is curvedly formed so as to be along the outer periphery of the front wheel 2. A spoiler portion 91*d* is formed so as to project rearwardly into an acute angle shape on the rear end portion of the fender middle portion 91*b*.

With reference to FIGS. 15 to 18, both side portions of the fender middle portion 91*b* are set as beam portions 91*e* formed so as to bulge to both outsides and linearly extend downwardly in the rear direction. An opening 91*f* in a slit shape is formed on both insides of the beam portion 91*e* so as to be along the beam portion 91*e*. The fender main body 91 is dividedly configured with the outside portions including the front end portion and both side end portions of the fender front portion 91*a*, the beam portion 91*e* of the fender middle portion 91*b*, a first member 94 forming the fender rear portion 91*c*, the inside portion except the outside portion of the fender front portion 91*a*, and a second member 95 forming the inside portion except the beam portion 91*e* of the fender middle portion 91*b*. The first member 94 and the second member 95 are fastened to each other by bolts B2 which are inserted into the front and the rear of the beam portion 91*e* from the upper and rear direction, respectively.

The front arm 92 has a front lower extending portion 92*a* extending from the front portion of the beam portion 91*e* in the front and rear direction so as to be approximately parallel to the fender front portion 91*a* in a side view. A covered portion 92*b* extends from the tip portion of the front lower extended portion 92*a* so as to be sharply inclined in the front and lower direction. The covered portion 92*b* extends so as to be approximately parallel in the longitudinal direction of the brake caliper 82 in a side view. The covered portion 92*b* includes a drooping portion 92*c* covering the brake caliper 82 from both insides. A lower extending portion 92*d* bends and extends to both outsides for covering the brake caliper 82 from the lower direction on the lower end portion of the covered portion 92*b*.

A first fastening portion 96 relative to the upper portion of the upper stay 26*b* of the caliper bracket 26*a* is provided in the rear direction of the lower portion of the front lower extended portion 92*a*. A second fastening portion 97 relative to the lower portion of the lower stay 26*c* of the caliper bracket 26*a* is provided on the lower extended portion 92*d* of the covered portion 92*b*. A third fastening portion 98 relative to the rear portion of the knuckle member 26 is provided on the tip portion of the rear arm 93.

A guide portion 99 is formed on the inside of the front end of the drooping portion 92*c* so as to be inclined and positioned on both further outsides (the brake caliper 82 side) as it approaches to the rear side. The guide portion 99 functions as a guide portion guiding the flow of air to the brake caliper 82 side.

A connected portion covers the concaved part 92*e* that covers the connected portion 86 so as to be surrounded with intervals and is formed on the portion opposite to the connected portion 86 of the brake caliper 82 of the drooping portion 92*c*.

A drain portion covers the concaved part 92*f* covering the drain portion 89 so as to be surrounded with intervals and is formed on the portion opposite to the drain portion 89 of the brake caliper 82 of the drooping portion 92*c*.

The knuckle member 26 of the front two-wheeled suspension device 4, the outer link member 25, and the outside portion of the upper arm 21 and the outside portion of the lower arm 23 are closely disposed on both insides of the front wheel 2, and are arranged between the front arm 92 and the rear arm 93. In other words, the front arm 92 and the rear arm 93 are arranged so as to avoid the front two-wheeled suspension device 4.

As explained above, the straddle type vehicle 1 in the above-mentioned embodiment has the head box 50 including the head pipe 51 into which the steering shaft 12 is inserted, and the air cleaner box 52 which sucks and filters the flow of air from the front direction of the vehicle, and has the main frame 18 as an separate body from the head box 50. The main frame supports the power unit 30 and simultaneously supports the front two-wheeled suspension device 4 and the rear wheel suspension device 45. The air cleaner box 52 is fixed on the main frame 18 through the fixing member 50*a*, which allows the head box 50 to be supported on the main frame 18.

According to this configuration, the air cleaner box 52 which is provided on the head box 50 is fixed on the main frame 18 which has less vibration relative to the power unit 30 without directly being supported on the power unit 30. Accordingly, the quietness can be enhanced by suppressing the intake noise, compared to the case wherein the air cleaner box 52 is directly supported on the power unit 30. The head box 50 can decrease the strength and rigidity without the input of the loads from the front two-wheeled suspension device 4 and the rear wheel suspension device 45. Thus, a reduction in the weight of the vehicle may be achieved.

Moreover, in the above-mentioned straddle type vehicle 1, the air cleaner box 52 is disposed in front of the seat 36 on which the rider is seated. The radiator 66 for cooling the power unit 30 is disposed in front of the air cleaner box 52. The guide portion 52*a* guiding the exhaust air from the radiator 66 to the lower direction is formed on the air cleaner box 52.

According to this configuration, the guide portion 52*a* formed on the air cleaner box 52 guides the exhaust air from the radiator 66 to the lower direction, which controls the flow of the exhaust air from the radiator 66 to the leg portion of the rider seating on the seat 36. In this structure, the heat will hardly be transmitted to the leg portion of the rider.

Furthermore, in the above-mentioned straddle type vehicle 1, the straightening plate 69*a* guiding the air stream of the exhaust air from the radiator 66 is provided in front of the guide portion 52*a*.

According to this configuration, the straightening plate 69*a* guides the air stream of the exhaust air from the radiator 66. Accordingly, the guide portion 52*a* of the air cleaner box 52 can easily guide the exhaust air from the radiator 66 to the lower direction, which can effectively control the flow of the exhaust air from the radiator 66 to the leg portion of the rider.

Moreover, the above-mentioned straddle type vehicle 1 has the intake duct 63 connected to the head box 50 and is opened to the front surface of the vehicle. The air guiding passage forming portion 67, which is adjacent to the intake passage 63*c*, is formed by the intake duct 63 which forms the air guiding passage 67*a* relative to the radiator 66.

The intake passage 63*c* relative to the head box 50 and the air guiding passage 67*a* relative to the radiator 66 are disposed so as to be adjacent to each other, which allows to effectively provide the intake passage 63*c* and the air guiding passage 67*a*.

Furthermore, in the above-mentioned straddle type vehicle 1, the radiator 66 is supported on the air cleaner box 52.

The radiator 66 is supported on the air cleaner box 52. Thus, there is no need to separately provide radiator supporting members, which allows reducing the number of the parts.

Furthermore, in the above-mentioned straddle type vehicle 1, the power unit 30 includes the engine 3 which has the cylinder 3b on both sides of the crank case 3a. The main frame 18 has the right and left pair frame main bodies 18a. Both frame main bodies 18a respectively extend so as to cross from above the right and left cylinders 3b to the rear direction and to bend in the side view.

The right and left frame main bodies 18a can support the crank case 3a in the wide area while avoiding the right and left cylinders 3b. Accordingly, the supporting and rigidity of the engine 3 can be increased. Simultaneously, the engine 3 can reinforce the main frame 18. Furthermore, the main frame 18 can suppress the increase in the horizontal width.

Moreover, in the above-mentioned straddle type vehicle 1, the air cleaner box 52 includes the right and left pair flow passage forming portions 56. The flow passage forming portions 56 are respectively supported on the frame main bodies 18a.

The right and left flow passage forming portions 56 of the air cleaner box 52 are respectively supported on the right and left of frame main bodies 18a. Accordingly, the air cleaner box 52 can be supported with good balance. Simultaneously, the quietness of the intake noise can be improved.

In addition, the present invention is not limited to the above-mentioned embodiment. For example, the straddle type vehicle includes the general vehicles such that the rider straddles the vehicle body (motorcycle, motor-tricycle (including a front one-wheeled and rear two-wheeled vehicle in addition to a front two-wheeled and rear one-wheeled vehicle) and a four-wheeled vehicle and the like).

The engine 3 in the embodiment is a vertical engine in which the crank shaft is disposed along the longitudinal direction, such as a horizontally opposed four-cylinder engine. However, the cylinder may be a two-cylinder type or a six-cylinder type. Simultaneously, the cylinder may be arranged is not limited to only a horizontally opposed type, but also a V-type. In addition, the engine may also be a transverse type one in which the crank shaft is disposed so as to be along the horizontal direction of the vehicle (in the width direction of the vehicle). In this case, the cylinders are arranged in various ways. Furthermore, the power unit 30 may be configured such that the driving source includes the electric motor.

The configuration in the above-mentioned embodiment is an example of the present invention. Various modifications such that the parts in the embodiment are replaced with the well-known parts can be applied without deviating from the scope of the present invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A straddle vehicle comprising:
   a head box including an inserted head pipe into which a handle steering shaft is inserted and an air cleaner box which sucks and filters a flow of air from a front direction of the vehicle;
   a main frame provided as a separate body from said head box, a power unit being directly connected to the main frame;
   a front wheel suspension device for axially supporting a front wheel;
   said air cleaner box is fixed on said main frame through a fixing member for allowing said head box to be supported directly on the main frame, said air cleaner box being disposed in front of a seat supported directly on the main frame and including an intake air inlet formed on a front side thereof; and
   a radiator for cooling the power unit, said radiator being positioned in front of said air cleaner box,
   wherein a portion of an exhaust air from said radiator is supplied to the intake air inlet formed on the front side of the air cleaner box and a front surface of said air cleaner box forming a guide portion for directing a remaining portion of said exhaust air downwardly in a rearward direction.

2. The straddle vehicle according to claim 1, and further including a straightening plate for guiding an air stream of the exhaust air from said radiator, said straightening plate being provided in front of said guide portion.

3. The straddle vehicle according to claim 2, and further including an intake duct connected to said head box and opened to the front direction of the vehicle, and an air guiding passage forming portion is positioned adjacent to an intake passage formed by said intake duct and forms an air guiding passage relative to said radiator.

4. The straddle vehicle according to claim 2, wherein said power unit includes an engine including a cylinder on both sides of a crank case, said main frame has a right and left pair frame main bodies, and both frame main bodies, respectively, extend so as to cross from above said cylinders to a rear direction and to bend in a side view.

5. The straddle vehicle according to claim 1, and further including an intake duct connected to said head box and opened to the front direction of the vehicle, and an air guiding passage forming portion is positioned adjacent to an intake passage formed by the intake duct and forms an air guiding passage relative to said radiator.

6. The straddle vehicle according to claim 5, wherein said power unit includes an engine including a cylinder on both sides of a crank case, said main frame has a right and left pair frame main bodies, and both frame main bodies, respectively, extend so as to cross from above said cylinders to a rear direction and to bend in a side view.

7. The straddle vehicle according to claim 1, wherein said power unit includes an engine including a cylinder on both sides of a crank case, said main frame has a right and left pair frame main bodies, and both frame main bodies, respectively, extend so as to cross from above said cylinders to a rear direction and to bend in a side view.

8. The straddle vehicle according to claim 7, wherein said air cleaner box includes right and left flow passage forming portions, and said flow passage forming portions are respectively supported on said frame main bodies.

9. A head box for a straddle vehicle comprising:
   an air cleaner box for sucking and filtering a flow of air from a front direction of the straddle vehicle;
   a main frame provided as a separate body from said head box;
   a power unit directly connected to the main frame; and
   a front wheel suspension device for axially supporting a front wheel;
   said air cleaner box is fixed on said main frame through a fixing member for supporting said head box directly on the main frame, said air cleaner box being disposed in front of a seat supported directly on the main frame and including an intake air inlet formed on a front side thereof; and a radiator for cooling the power unit, said radiator being positioned in front of said air cleaner box;

wherein a portion of an exhaust air from said radiator is supplied to the intake air inlet formed on the front side of the air cleaner box and a front surface of said air cleaner box forming a guide portion for directing a remaining portion of said exhaust air downwardly in a rearward direction.

10. The head box for a straddle vehicle according to claim 9, and further including a straightening plate for guiding an air stream of the exhaust air from said radiator, said straightening plate being provided in front of said guide portion.

11. The head box for a straddle vehicle according to claim 9, and further including an intake duct connected to said head box and opened to the front direction of the vehicle, and an air guiding passage forming portion is positioned adjacent to an intake passage formed by the intake duct and forms the air guiding passage relative to said radiator.

12. The head box for a straddle vehicle according to claim 9, wherein said power unit includes an engine including a cylinder on both sides of a crank case, said main frame has a right and left pair frame main bodies, and both frame main bodies, respectively, extend so as to cross from above said cylinders to a rear direction and to bend in a side view.

* * * * *